(12) United States Patent
Mori et al.

(10) Patent No.: US 7,610,217 B1
(45) Date of Patent: *Oct. 27, 2009

(54) AUTOMATIC AUCTION METHOD AND SYSTEM ON SERVER-CLIENT SYSTEM

(75) Inventors: Masakatsu Mori, Yokohama (JP); Masahiro Ogura, Sakura (JP); Masahiro Takeshima, Tokyo (JP); Kenji Arai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/506,808

(22) Filed: Feb. 18, 2000

Related U.S. Application Data

(63) Continuation of application No. 08/916,154, filed on Sep. 2, 1997, now Pat. No. 6,044,363.

(30) Foreign Application Priority Data

Sep. 4, 1996 (JP) .................................. 08-233918

(51) Int. Cl.
G06Q 30/00 (2006.01)
(52) U.S. Cl. .............................. 705/26; 705/27; 705/37
(58) Field of Classification Search ............. 705/26–27, 705/35–37; 379/93.12, 93.01; G06F 17/60; H04M 11/00
See application file for complete search history.

(56) References Cited

U.S. PATENT DOCUMENTS 3,581,072 A * 5/1971 Nymeyer ..................... 705/37
4,789,928 A * 12/1988 Fujisaki ....................... 705/37
5,136,501 A 8/1992 Silverman et al.
5,689,652 A 11/1997 Lupien et al.

(Continued)

FOREIGN PATENT DOCUMENTS

CA 2305834 A1 * 10/2001

(Continued)

OTHER PUBLICATIONS

Chavez et al., "Kasbah: An agent marketplace for buying and selling goods", Proc. of the Inter. Conf. on the Practical Appl . . . , asc/pattie@media.mit.edu.*

(Continued)

*Primary Examiner*—Yogesh C Garg
(74) *Attorney, Agent, or Firm*—Brundidge & Stanger, P.C.

(57) ABSTRACT

In automatic auction method which makes it unnecessary for bidders to stay before auction terminals at the time of auction and which makes possible auction transactions on an open network on which it is difficult to assure the on-line and real time properties, a plurality of auction ordering information pieces each containing a desired price, number of purchase, and a highest possible price in competition for the desired price and received from bidder terminals via on-line circuits are collected. Until an auction issue appears, the price is lowered. If there is at least one auction issue and a desired quantity which is the sum total of the numbers of purchase of the auction issues is not satisfied, then it is determined whether there is an auction issue coinciding in price by comparing the set price with (the desired price+the highest possible price in competition). Until the desired quantity is satisfied, the price is raised.

44 Claims, 17 Drawing Sheets

U.S. PATENT DOCUMENTS

| | | | |
|---|---|---|---|
| 5,818,914 A | | 10/1998 | Fujisaki |
| 5,826,244 A | | 10/1998 | Huberman |
| 5,835,896 A | * | 11/1998 | Fisher et al. .................. 705/37 |
| 5,845,265 A | * | 12/1998 | Woolston ...................... 705/37 |
| 5,890,138 A | * | 3/1999 | Godin et al. .................. 705/26 |
| 5,905,974 A | | 5/1999 | Fraser et al. |
| 5,905,975 A | * | 5/1999 | Ausubel ....................... 705/37 |
| 6,026,383 A | * | 2/2000 | Ausubel ....................... 705/37 |
| 6,285,989 B1 | * | 9/2001 | Shoham ....................... 705/37 |
| 6,618,571 B2 | * | 9/2003 | Bartscher et al. ............ 399/310 |
| 2001/0009005 A1 | * | 7/2001 | Godin et al. .................. 705/37 |

FOREIGN PATENT DOCUMENTS

| | | | |
|---|---|---|---|
| CA | 2394503 A1 | * | 1/2003 |
| EP | 0 628 920 | | 12/1994 |
| EP | 628 920 | | 12/1994 |
| EP | 0 716 386 | | 6/1996 |
| EP | 1041502 A2 | * | 10/2000 |
| EP | 1111529 A2 | * | 6/2001 |
| GB | 1489571 | | 10/1977 |
| GB | 2380295 A | * | 4/2003 |
| JP | 7-073251 | | 3/1995 |
| JP | 07 073251 | | 7/1995 |
| JP | 8-79240 | | 3/1996 |
| KR | 2002012480 A | * | 2/2002 |
| WO | WO92/15174 | | 9/1992 |
| WO | WO 92/15174 | | 9/1992 |
| WO | 95/06917 | | 3/1995 |
| WO | WO 0008578 A1 | * | 2/2000 |
| WO | WO 0165380 A1 | * | 9/2001 |
| WO | WO 0188818 A2 | * | 11/2001 |

OTHER PUBLICATIONS

Rockoff et al., "Design of an Internet-based Syst. for remote Dutch auctions", Electronic Networking Appl. & Policy, v5n4, pp. 10-16.*

Lee, Electronic brokerage & electronic auction; the impact of IT on market structures, Proc. Of 29th Annual Hawaii Inter. Conf. on Syst. Science, pp. 397-406, 1996 IEEE.*

Derwent-Acc-No. 2002-740576, Sep. 26, 2002, Online goods auctioning method through internet, involves submitting bids for buyer automatically, until current bid amount for buyer exceeds proxy bid amount.*

Derwent-Acc-No. 2002-434193—Mar. 28, 2002, Interaction automation method in electronic commerce auction site, involves enabling interaction between scan agent and bid proxy to place the bid of buyer and computing higher bid if counteroffer is accepted.*

Chavez et al. "Kasbah: An Agent Marketplace for Buying and Selling Goods", Proceedings of the Internationall Conference on the Practical Application of Intelligent Agents and Multi-Agent Technology, Apr. 1996.

Rockoff et al. "Design of an Internet-Based System for Remote Dutch Auctions", Internet Research: Electronic Networking Applications and Policy, vol. 5, No. 4, 1995, pp. 10-16.

European Search Report dated Mar. 16, 2000.

"Is There a Future in Wholesale Marketplaces", edited by Shigeo Akitani/Food distribution study society and published by Japan economic newspaper company, 1996, pp. 140-143.

Haggle Online, Proxy Bidding, http://www.haggle.com/proxy.html.

eBay Inc, Proxy Bidding, http://pages.ebay.com/aw/proxy-bidding.html.

eBay Inc, Proxy Bidding, http://pages.ebay.com/aw/help/help-t-bid-prxy.html.

eBay Inc, Bidding, http://pages.ebay.com/aw/nut-bid4.html.

* cited by examiner

FIG.3

```
OZENJI MARKETPLACE —TULIP—
```

◆ TULIP

PRODUCT NUMBER :215-960529-001-001  ~211          [ORDER] ~221
                                                          219

| VARIETY | ○○ | ~212 |
|---|---|---|
| STANDARD AND COLOR | M-S | ~213 |
| GROWING AREA | YOKOHAMA CITY | ~214 |
| SHIPPING PERSON | UTUKUSHIGAOKA AGRICULTURAL COOPERATIVE | ~215 |
| AMOUNT | 200 BOXES | ~216 |
| TIME LIMIT | 96/05/29 15:00 | ~217 |
| ACTION END TIME | 96/05/29 15:30 | ~218 |

PRODUCT NUMBER :215-960529-001-002          [ORDER]

| VARIETY | △△ |
|---|---|
| STANDARD AND COLOR | L-S |
| GROWING AREA | KAWASAKI CITY |
| SHIPPING PERSON | NIJIGAOKA AGRICULTURAL COOPERATIVE |
| AMOUNT | 120 BOXES |

FIG.6

```
AUCTION ORDERING SITUATION
```

◆ ORDERING PRODUCT LIST   511

```
96/05/28 12:34:56 215-960528-003-002 (FINISHED)
96/05/29 13:53:21 215-960529-001-001 (FINISHED)
96/05/29 13:53:21 215-960529-005-002 (NOT YET)
```

512 — [DISPLAY/CORRECT ORDERING INFORMATION]   [SUSPEND ORDERING] — 513
514 — [DISPLAY AUCTION RESULT]                 [CLOSE]            — 515

FIG.4

AUCTION CONDITION INPUT EDITOR

- PURCHASING PERSON ID: m-mon — 311
- PRODUCT NUMBER: 215-960529-001-001 — 312
- RULE LIST — 313
  - PURCHASE 80 BOXES AT ¥90 (+¥2)
  - PURCHASE AT LEAST 50 AND AT MOST 80 BOXES AT ¥90 (+¥4)
- 314: ☒ DO NOT PARTICIPATE IN AUCTION ONCE SUCCESSFUL BID HAS BEEN CONDUCTED

- 321: NEWLY REGISTER
- 324: PRIORITY ↑
- 322: CORRECT
- 323: DELETE
- 325: PRIORITY ↓
- 326: TRANSMIT
- 327: SUSPEND

RULE EDITOR — 41

◆ PRICE CONDITION — 411
- ● SPECIFIED PRICE  90 YEN — 412
- ○ LOWEST PRICE

MAXIMUM ALLOWANCE IN COMPETITION  4 YEN — 413

◆ AMOUNT CONDITION (ARRIVAL AMOUNT:200)
- ○ ALL AMOUNT PURCHASE — 421
- ○ FIXED AMOUNT PURCHASE  [  ] BOXES — 422
- ● RANGE DESIGNATION PURCHASE  50 TO 80 BOXES — 423, 424

425 — ☐ PURCHASE EVEN IF DESIRED AMOUNT IS NOT REACHED

- 431: REGISTER IN RULE LIST
- 432: SUSPEND

FIG.7

```
AUCTION RESULT OF PRODUCT(215-960529-001-001)                          — 61

◆ SUCCESSFUL BID RESULT —— 611
   SUCCESS BID OF 80 BOXES AT ¥93
   60 BOXES AT ¥95 FOR FIRST PERSON
   80 BOXES AT ¥93 FOR SECOND PERSON
   60 BOXES AT ¥88 FOR THIRD PERSON
                                          612
◆ TRANSACTION PROCESS

┌────────────────────────────────────────────────┐
 │ (¥91:200 BOXES) THERE ARE NO DESIRING PERSONS  │
 │ (¥90:200 BOXES) COMPETITION OCCURRENCE AND PRICE RISE │
 │ (¥91:200 BOXES) COMPETITION CONTINUATION AND PRICE RISE │
 │ (¥92:200 BOXES) COMPETITION CONTINUATION AND PRICE RISE │
 │ (¥93:200 BOXES) COMPETITION VANISHED AND SUCCESSFUL │
 │                 BIDDER DETERMINED              │
 │         SECOND PERSON CONDUCTED SUCCESSFUL     │
 │         BID FOR 80 BOXES AT ¥93.               │
 └────────────────────────────────────────────────┘

◆ RULE RESULTS —— 613

(1) PURCHASE AT LEAST 50 AND AT MOST 80 BOXES AT ¥90 (+¥4):
    SUCCESSFUL BID OF 80 BOXES HAS BEEN CONDUCTED AT ¥93

(2) PURCHASE AT LEAST 80 AND AT MOST 120 BOXES AT ¥88 (+¥4):
    NOT USED ( CLOSE )—— 614
```

FIG. 13

AUCTION MONITOR — 91

◆ LIST OF PURCHASING PERSONS DESIRING PURCHASE  NUMBER OF BIDDERS: 3  PRODUCT NUMBER: 215-960529-001-001

REGISTRATION NUMBER: 1  
[ABANDON]  
PURCHASING PERSON ID: teramura  
DESIRED QUANTITY: 150  
ALLOCATED QUANTITY: NOTHING REGISTRATION NUMBER: 3  
[SUCCESSFUL BID]  
PURCHASING PERSON ID: kosaka  
DESIRED QUANTITY: 60  
ALLOCATED QUANTITY: 60

REGISTRATION NUMBER: 4  
[ABANDON]  
PURCHASING PERSON ID: m-mori  
DESIRED QUANTITY: 80  
ALLOCATED QUANTITY: NOTHING

◆ AUCTION SITUATION  
REMAINING QUANTITY: 140 — 914  
PRICE: 93

◆ TRANSACTION PROCESS — 917  
(¥90:200 BOXES) COMPETITION OCCURRENCE, PRICE RISE  
(¥91:200 BOXES) COMPETITION CONTINUATION, PRICE RISE  
(¥92:200 BOXES) COMPETITION CONTINUATION, PRICE RISE  
(¥93:200 BOXES) COMPETITION VANISHMENT, SUCCESSFUL BIDDER DETERMINED  
KOSAKA MADE SUCCESSFUL BID FOR 60 BOXES AT ¥93

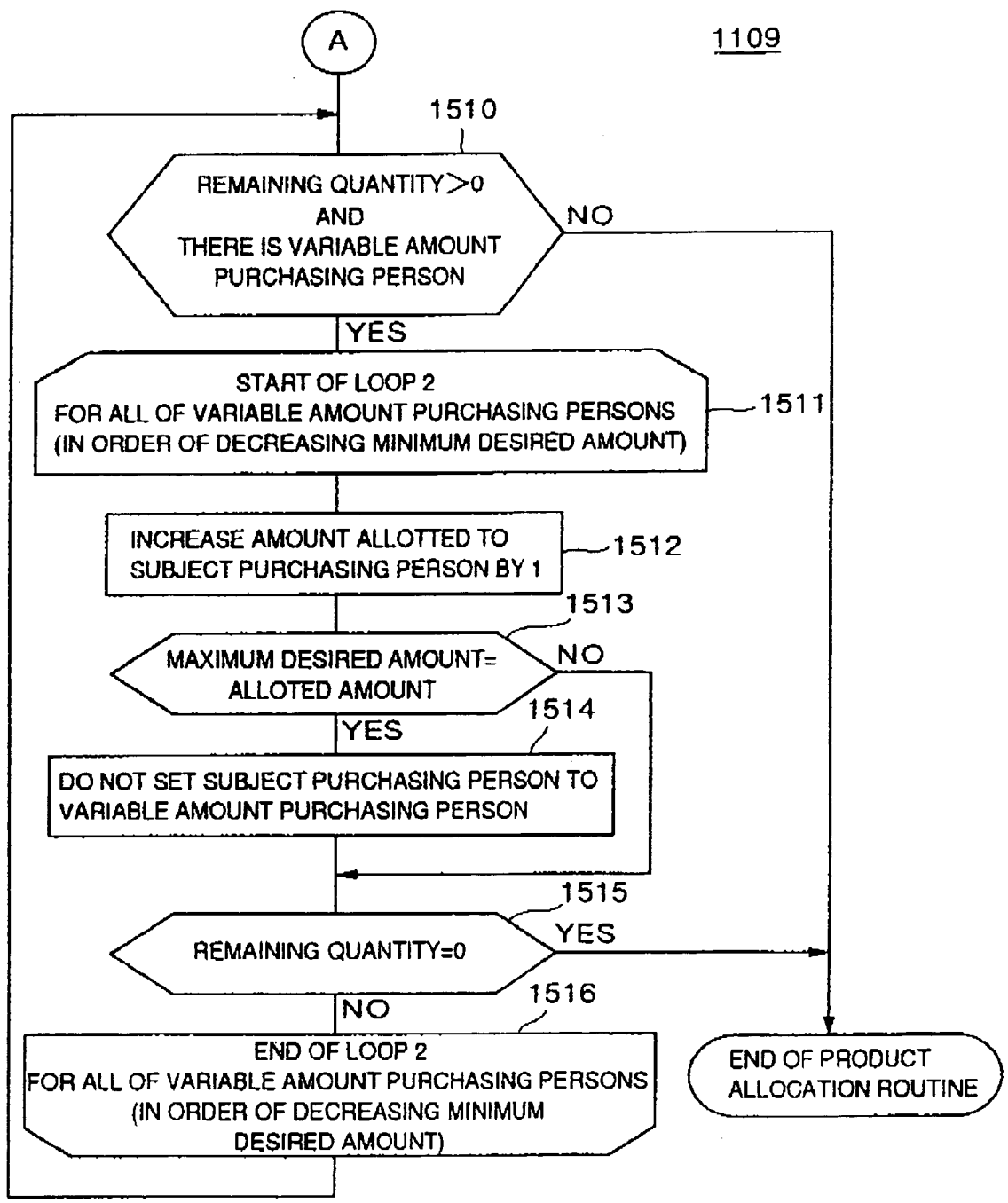

[AUCTION CONDITION]

| | |
|---|---|
| QUANTITY | 200 BOXES |
| INITIAL PRICE | ¥100 |
| INCREMENT OF DESCENDING PRICE | ¥1 |
| LOWEST PRICE | ¥70 |
| INCREMENT OF ASCENDING PRICE IN COMPETITION | ¥1 |
| HIGHEST ASCENDING PRICE | ¥10 |

[REGISTERED PURCHASING PERSONS AND AUCTION ORDERING INFORMATION]

[PURCHASING PERSON A]
  PURCHASE 60 BOXES AT ¥95 (+¥2) ---2021
PURCHASE ALL AMOUNT AT LOWEST PRICE (+¥2)

[PURCHASING PERSON B]
  PURCHASE 100 BOXES AT ¥90 (+¥2) ---2022
PURCHASE 70 TO 100 BOXES AT ¥90 (+¥4)
DO NOT PARTICIPATE IN AUCTION AFTER
CONDUCTING SUCCESSFUL BID ONCE

[PURCHASING PERSON C]
  PURCHASE 80 BOXES AT ¥90 (+¥4) ---2023

[PURCHASING PERSON D]
  PURCHASE 60 TO 150 BOXES AT ¥88 (+¥3) ---2024

AUTOMATIC AUCTION METHOD AND SYSTEM ON SERVER-CLIENT SYSTEM

This is a continuation application of U.S. Ser. No. 08/916,154, filed Sep. 2, 1997, now U.S. Pat. No. 6,044,363.

BACKGROUND OF THE INVENTION

The present invention relates to an auction method using a communication network. In particular, the present invention relates to an automatic auction method whereby purchasing persons located in remote places participate in a transaction by sending auction ordering information to an auctioneer via an open communication network represented by the Internet and an auction is automatically conducted on the basis of the auction ordering information.

Wholesale marketplaces serve as places for making distribution of fresh foods and the like smooth and making transactions of them proper. In particular, prices formed in wholesale marketplaces exert great influences on the growing areas and consumption. In the wholesale marketplace system, therefore, prices need to be formed by quick and fair valuation based upon the supply-demand relations of the fresh foods. Accordingly, purchase and sale transactions in wholesale marketplaces are conducted by the "auction or sealed bid" in principle.

As against such a principle, transaction forms such as the "receipt in advance" (the wholesale before the sale start time) have become the mainstream instead of the marketplace transactions as a result of the increase in scale of growing areas, the increase in distance from growing areas, the increase in scale of retail departments, and the progress of intensiveness of the retail departments. In addition, electronized products are also becoming subjects of transactions.

In order to destroy such a status quo, "information transactions" using advance shipping information given from shipping persons by making information concerning transactions electronic are now under study in various places. As one form realizing this information transaction, a system is shown in JP-B-7-117976. In this system, shipping information given from shipping persons is provided to wholesalers and bidders, the wholesalers and the bidders conduct a bid on the basis of the shipping information, and a wholesaler or a bidder of the highest price makes a successful bid. As a method for mechanically conducting transaction processing which relates to the information transactions, there is a mechanical auction ("Is there a future in wholesale marketplaces," edited by Shigeo Akitani/Food distribution study society and published by Japan economic newspaper company in 1996, pp. 140-143). In the mechanical auction, all purchasing persons gather around a marketplace, and present desired prices from respective terminal devices. Besides this, the mechanical auction described in this paper provides the following function. Even if a certain person is not present in the marketplace, the person can effect a sealed bid at the time of the auction so long as the person inputted beforehand desired quantities and desired prices for a desired list of articles.

In the former cited JP-B-7-117976, mechanization of a sealed bid is described. In the mechanical auction of the latter cited paper, auction mechanization is described. In an actual auction, however, a purchasing person does not always conduct a successful bid at a preset desired price. Even in the case where the latter cited auction mechanization is employed, price presentation needs to be conducted between the bidder and the auctioneer according to the situation of the auction several times until the end of the auction. While the auction is being conducted, a person restrained before an auction terminal device needs to form a judgment and give instructions according to the situation of the auction.

Furthermore, in the case of an auction, bidders must cope with the present situations extemporaneously. Therefore, the bidders must participate on-line and in real time.

SUMMARY OF THE INVENTION

An object of the present invention is to provide an automatic auction method which makes it unnecessary for the bidders to be constrained before terminal devices at the time of execution of an auction even if the situation of the auction changes every moment.

Another object of the present invention is to provide an automatic auction method which makes possible auction transactions on open networks such as the Internet.

Another object of the present invention is to provide an automatic auction method whereby auction prices can be automatically determined.

In order to achieve the above described objects, an auction is executed by the following procedure in a system in which bidder terminals are connected to an auctioneer terminal via on-line circuits.

On bidder terminals, information about an auction received from the auctioneer terminal via on-line circuits is displayed. This information about the auction may be procured spontaneously by the bidders via the Internet or personal computer communication, or may be forcibly sent to bidders by the auctioneer via electronic mail.

On bidder terminals, information about the auction is displayed. An auction subject is selected by each bidder (terminal operator). For the selected auction subject, the number of purchase, a desired price, and the highest possible price in competition for the desired price (a variation value indicating an addition allowed for the desired price) are specified on the screen by the bidder. Auction ordering information containing these information pieces is created, and transmitted to the auctioneer terminal.

The display and information inputting on the bidder terminal can be implemented by using, for example, a browser broadly known in the Internet. A plurality of inputted information pieces may also be sent to a server by using the function of the known browser.

For each selected auction subject, a flag specifying whether participation in the auction should be conducted after effecting a successful bid once, or a flag specifying whether a purchase should be conducted even if the number of purchase is less than a desired amount, can be added to the auction ordering information. The number of purchase can be specified by any method selected out of constant quantity designation, quantity range designation, and remaining quantity designation.

The auctioneer terminal collects and stores a plurality of auction ordering information pieces received via on-line circuits such as the Internet. These auction ordering information pieces have been sent from a plurality of bidders. At the auction start time, for example, such as 10 a.m. everyday, an auction is started. At the auction, a price is first set. As for this price, an initial value for starting the auction may be inputted. Subsequently, the stored auction ordering information pieces are searched for a desired price coinciding with the set price. If there are auction issues, those transactions are settled. Otherwise, a price is reset.

As for the price resetting, the price is lowered in the case where there are no auction issues (i.e., in the case of a non-competitive state). In the case where the amount of the auction subject does not satisfy auction issues (in the case where (the amount which can be auctioned)<(auction issues), i.e., in the case of the competitive state), the auction price is raised. It is determined by effecting a comparison with the desired price whether there is a coinciding auction issue. In the case of the competitive state, however, it is determined by comparing (the set auction price) with (((the desired price)±(the highest possible price in competition)) whether there is an auction issue satisfying the condition.

Until all auction issues are sold or a fixed price is reached, such processing is repeated.

The processing to be executed on the bidder terminals and the auctioneer terminal can be implemented by using computer programs. These programs can be stored on a storage medium such as a floppy disk, an optical disk, or a hard disk, and can be distributed via a network.

BRIEF DESCRIPTION OF THE DRAWING

FIG. 3 is a product information providing screen in an embodiment of the present invention;

FIG. 4 is an auction condition input editor in an embodiment of the present invention;

FIG. 5 is an auction rule editor in an embodiment of the present invention;

FIG. 6 is an auction ordering situation screen in an embodiment of the present invention;

FIG. 7 is an auction result screen in an embodiment of the present invention;

FIG. 13 shows the auction monitor at the time of a successful bid in an embodiment of the present invention;

FIG. 18 is a processing flow diagram of a product allocation routine showing an embodiment of the present invention and is a continuation of FIG. 17;

FIG. 19 shows auction conditions showing an embodiment of the present invention; and FIG. 20 shows registered purchasing persons and auction ordering information showing an embodiment of the present invention.

DESCRIPTION OF THE PREFERRED EMBODIMENTS

Figure 1:
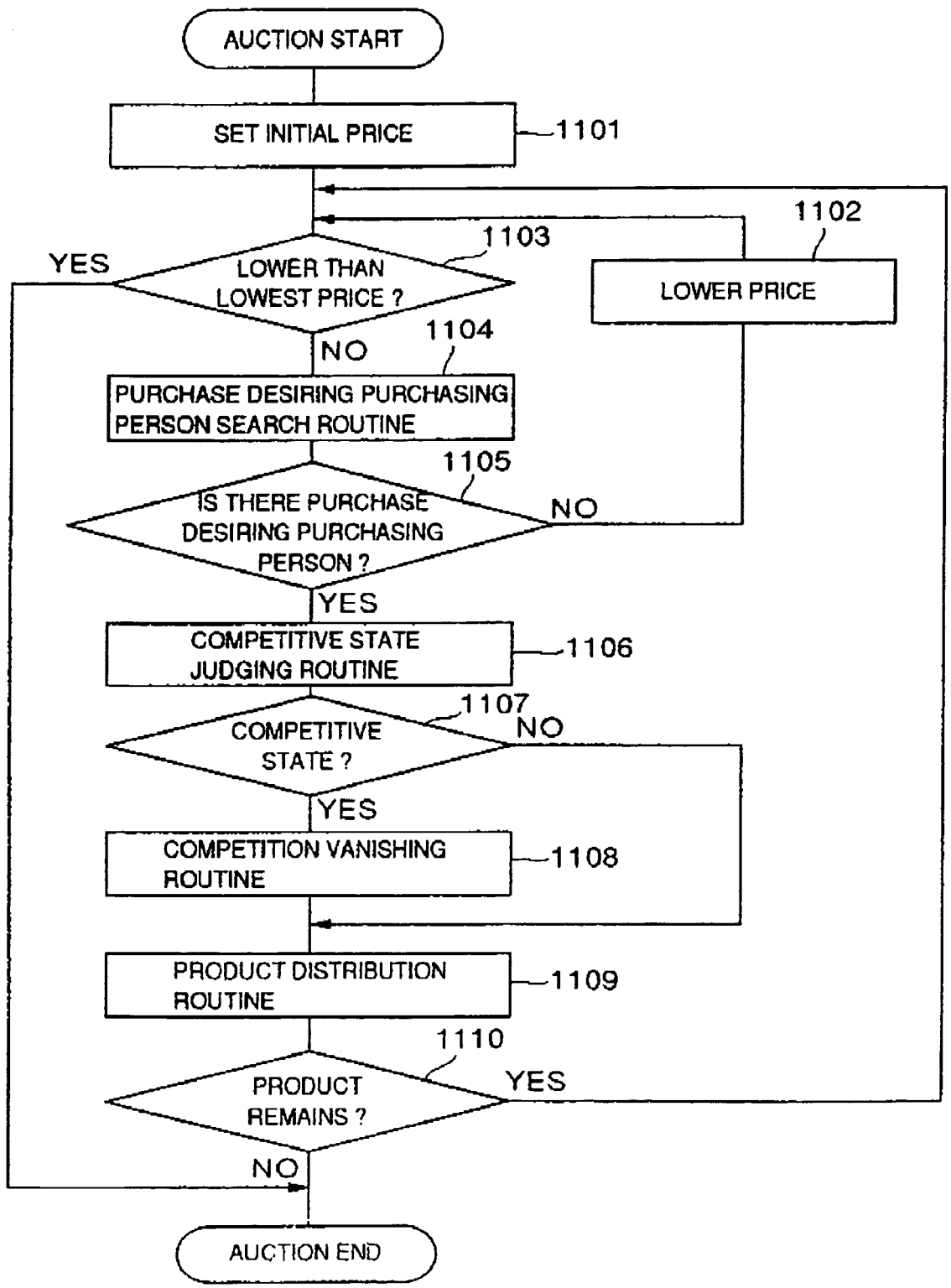
FIG. 1 is an entire processing flow diagram of an automatic auction method in an embodiment of the present invention.

Hereafter, embodiments of the present invention will be described in detail by referring to the drawing.

Figure 2:
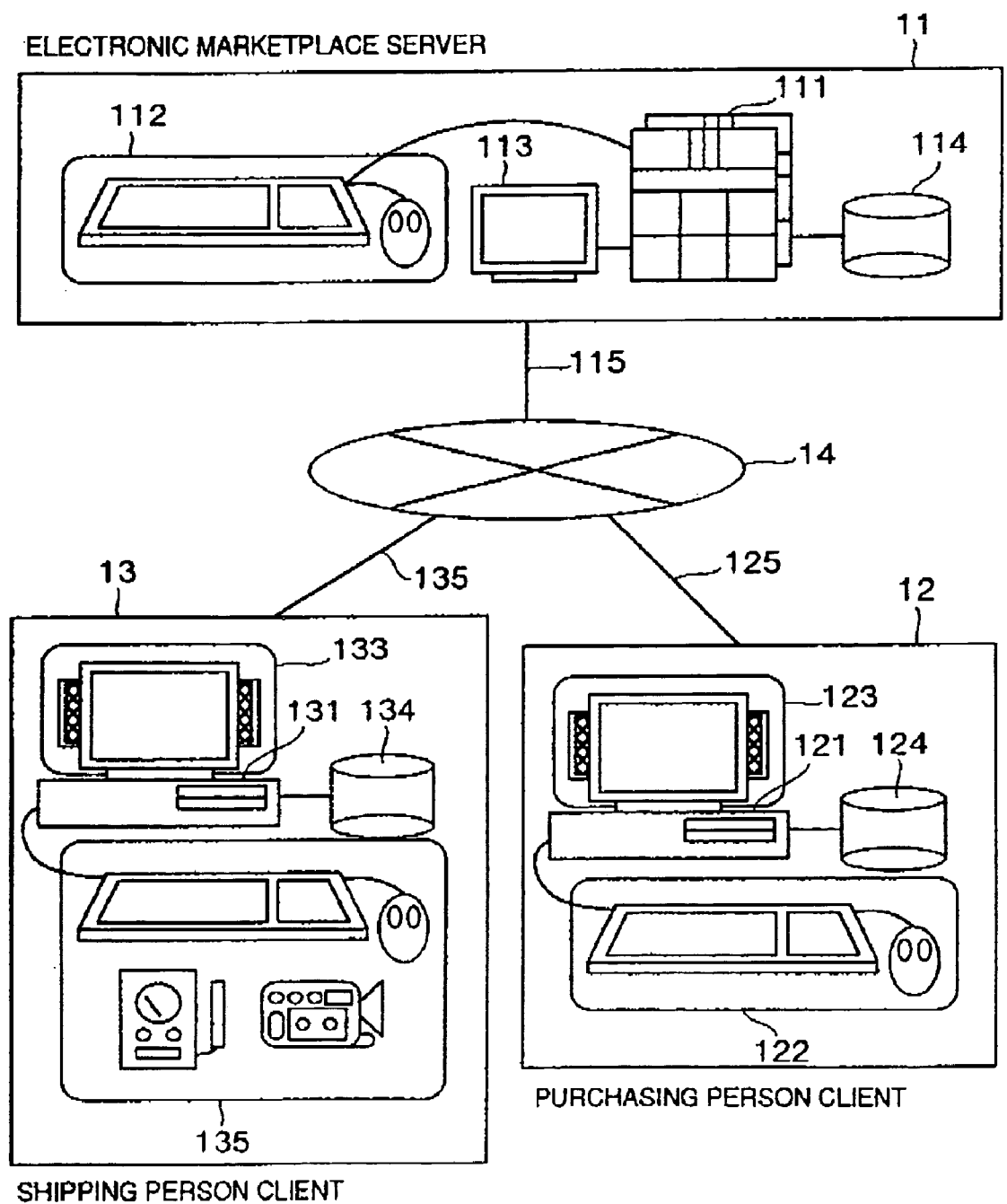
FIG. 2 is a system configuration diagram showing an embodiment of the present invention.

FIGS. 1 and 14 through 18 show processing flows of the present embodiment. FIG. 2 is an entire configuration diagram of a system of the present embodiment. FIGS. 3 through 13 show screen images of the present embodiment.

First of all, the entire configuration diagram of an automatic auction system shown in FIG. 2 will now be described.

In the automatic auction system of the present embodiment, an electronic marketplace server 11, a plurality of purchasing person clients 12, and a plurality of shipping person clients 13 are linked via a communication network 14. The electronic marketplace server 11 conducts collection and management of product information sent from the shipping person clients 13 and auction ordering information sent from the purchasing person clients 12, and conducts an auction on the basis of the auction ordering information. The purchasing person clients 12 issue product orders to the electronic marketplace server 11. The shipping person clients 13 provide the electronic marketplace server 11 with product information of shipped products. As the network 14, a personal computer network using a LAN, the Internet, or a public telephone network, or an arbitrary different wired or wireless network, can be used.

(1) Device configuration of electronic marketplace server 11

The electronic marketplace server 11 is a device for auction. As for the configuration, an input device 112, an output device 113, a storage device 114, and a communication cable 115 are connected to a computer 111.

The input device 112 is a device, such as a keyboard or a pointing device (mouse, pen or the like), used by an operator to input information.

The output device 113 is a device for visibly displaying registered product information on a screen or a paper medium. As the output device 113, a CRT display, a liquid crystal display, a printer device or the like, for example, can be used.

The storage device 114 is a device for storing a program executed by the computer 111 and a large quantity of data files. As the storage device 114, a magnetic disk, an optical disk, an optical magnetic disk, a semiconductor memory, or the like can be used.

In the storage device 114 of the electronic marketplace server 11, information concerning shipping products, such as varieties, ranks, amounts, prices, and producers, provided by the shipping person client 13 is stored beforehand.

The communication cable 115 is, for example, a telephone circuit for transmitting the information. As the communication cable 115, a cable capable of transmitting a large quantity of data at high speed, such as an optical cable, is desirable. If in this case data are sent/received between the electronic marketplace server 11 and the communication network 14 by using a wireless communication circuit, a wireless communication circuit interface is provided instead of the communication cable 115.

In order to provide the product information stored in the storage device simultaneously to a large number of other systems and accept the auction ordering information, it is desirable to use a computer of high speed and large capacity, a work station, or a personal computer as the electronic marketplace server 11.

(2) Device configuration of purchasing person client 12

In the purchasing person client 12, an input device 122, an output device 123, a storage device 124, and a communication cable 125 are connected to a computer 121. The structures of these elements are fundamentally the same as those of the input device 112, the output device 113, the storage device 114, and the communication cable 115, and consequently their descriptions of them will be omitted.

(3) Device configuration of shipping person client 13

In the shipping person client 13, an input device 132, an output device 133, a storage device 134, and a communication cable 135 are connected to a computer 131. The structures of there elements are fundamentally the same as those of the input device 112, the output device 113, the storage device 114, and the communication cable 115, and consequently their descriptions of them will be omitted.

(4) Device configuration of communication network 14

The device configuration of the communication network 14 can be formed by a high-speed communication network, for example, such as a B-ISDN or an ATM-LAN. To be concrete, the communication network 14 is an open network represented by the Internet, or a network using a private circuit of personal computer communication or the like.

The purchasing person client 12 is a bidder terminal. The electronic marketplace server 11 is an auctioneer terminal.

The summary of the processing flow of the present embodiment will be hereafter described.

First of all, the shipping person client 13 registers information of products to be shipped into the electronic market server 11.

The electronic marketplace server 11 notifies the purchasing person client 12 of the registered product information by using, for example, the WWW (World Wide Web) or the like. At a predetermined time, the electronic marketplace server 11 accepts auction ordering information from the purchasing person client 12.

By using a method which will be described later, the purchasing person client 12 procures product information from the electronic marketplace server 11. In the case where products desired to be bought have been found, the purchasing person client 12 creates auction ordering information by using a method which will be described later, and registers it in the electronic marketplace server 11. If the predetermined time limit for auction ordering information has not been reached, the purchasing person client 12 can amend or delete the registered auction ordering information by using a method which will be described later.

The electronic marketplace server 11 manages and monitors the auction ordering information. When the time limit for auction ordering information has been reached, the electronic marketplace server 11 terminates the acceptance of auction ordering information, and conducts an auction on the basis of the accepted auction ordering information by using a method which will be described later. Then the electronic marketplace server 11 notifies the purchasing person client 12 of an auction result by using, for example, the WWW (World Wide Web), electronic mail, or the like.

By using a method which will be described later, the purchasing person client 12 procures the result of the auction from the electronic marketplace server 11.

Hereafter, respective methods will be further described by referring to the drawing.

By using a browser of the WWW installed in the computer 121, the purchasing person client 12 accesses the electronic marketplace server 11, and procures the product information. A screen displayed to the browser is a product information screen 21 shown in FIG. 3. On the screen, a product number 211 and attribute information of the product are displayed as the product information. The product attribute information includes a variety 212, standard and color 213, a growing area 214, a shipping person 215, an amount 216, and a product image 219 such as a color photograph of the product. As information concerning the auction, the time limit for auction ordering information 217 and scheduled auction end time 218 may also be included in the product information. In the case where a purchasing person serving as a bidder wants to purchase a displayed product, the purchasing person presses an ordering button 221 associated with the product with the mouse.

If the ordering button 221 on the product information screen 21 shown in FIG. 3 is pressed, an auction condition input editor 31 shown in FIG. 4 appears. In the auction condition input editor 31, a purchasing person ID 311 representing a bidder and an ordering product number 312 are displayed. As the purchasing person ID, the electronic mail address and other specific identifiers, for example, of the purchasing person can be used. As for the product number 312, the product number 211 of the product selected on the screen of FIG. 3 is automatically stored. A rule list 313 forms a part of the auction ordering information sent to the electronic marketplace server 11. The rule list 313 includes a desired auction price which is a purchase condition of the product, a purchase amount, and a maximum allowed price in competition for the desired price. For example, the representation "purchase 80 boxes at ¥90 (+¥2)" in FIG. 4 indicates that the desired auction price is ¥90, the maximum allowed price in competition is +¥2, and the purchase amount is 80 boxes. In other words, the purchasing person desires to buy the product at ¥90, but up to ¥92 can be paid in the case of competition with another purchasing person. A field 314 is information specifying whether the purchasing person will participate in the auction after the purchasing person has conducted a successful bid once.

A new rule registration button 321, a rule correction button 322, a rule deletion button 323, a rule priority raising button 324, a rule priority lowering button 325, a button 326 for transmitting the auction ordering information to the electronic marketplace server 11, and a button 327 for suspending the auction ordering information creation are icons displayed on the screen.

If the purchasing person presses the new registration button 321, or selects one of the rules displayed in the rule list 313 and thereafter presses the correction button 322, a rule editor shown in FIG. 5 is displayed and rule generation/ correction is conducted. The rule editor 41 may be displayed by switching from the auction condition input editor 31, or on the same screen by using the multi-window technique.

In the rule editor 41, a field 411 is used to select a price input method. Either the case where a price is specified or the case where the purchase at the lowest price is desired is specified. A field 412 located in the vicinity thereof is a field for inputting a price in the case where a price is specified. A field 413 is used to input a maximum allowance in competition. A field 421 is used to select an amount input method serving as a condition of the purchase amount. Three specification methods are prepared: all amount purchase, fixed amount purchase, and range designation purchase. The all amount purchase specifies the purchase of the all purchasable amount in the auction. The fixed amount purchase specifies the purchase of a predetermined fixed amount. The range designation purchase specifies the purchase amount by using a range. Furthermore, in the vicinity of the field 421, a field 422 used to input the amount in the case of the fixed amount purchase and fields 423 and 424 used to input the range in the case of the range designation purchase are provided. A field 425 is used to specify whether a purchase is effected even if the available amount is less than the desired amount. Furthermore, on the screen, two icons, i.e., a button 431 for registration into the rule list, and a button 432 for suspending the rule generation/ correction on the way, are displayed.

In the case where a rule is to be generated/ corrected, it can be conducted by inputting the price condition to the fields 411 through 413, inputting the amount condition to the fields 421 through 425, and pressing a registration button 431. In the case where a rule is to be suspended on the way, the suspension button 432 is pressed.

In the case where the specified range purchase is specified in the amount condition and the upper amount is not prescribed, i.e., in the case where the upper limit should be set equal to the remaining quantity, only the lower limit is inputted to the field 423. In the case where the lower limit is not to be prescribed, only the upper limit is inputted to the field 424.

A generated rule can be deleted by using the deletion button 323. The generated rules are evaluated in the order shown in the rule list 313. For changing their priorities, therefore, priority change buttons 318 and 319 are used.

By pressing the transmission button 326, auction ordering information is transmitted to the electronic marketplace server 11 and participation in the auction is registered. The auction ordering information thus transmitted contains at least the rule list 313 and a flag added thereto to specify whether the purchasing person participates in the auction once a successful bid has been conducted. The transmission of the auction ordering information at this time can be implemented by using function of known browser, for example, such as the Netscape Navigator 3.0 produced by the Netscape Inc. In the case where a registration number, registration time, and the like are transmitted from the electronic marketplace server 11 after completion of the registration, they may be displayed on the output device 123 or they may be stored in the storage device 124. The registration number transmitted from the electronic marketplace server 11 may be used as an inquiry key for the electronic marketplace server 11 in the future. In the case where the participation in the auction is to be passed up, the suspension button 327 is pressed and the auction ordering information creation is terminated.

By a registration situation screen 51 shown in FIG. 6, the purchasing person client 12 procures the auction registration situation from the electronic marketplace server 11. On the registration situation screen 51, an ordering product list 511 is displayed. The ordering product list 511 is a list of the products ordered by the purchasing person. On the screen, icons of an auction ordering information display/ correction button 512, an order suspension button 513, an auction result display button 514, and a button 515 for closing the registration situation screen 51 are also displayed. In the ordering product list 511, a list of ordering products is displayed. In the ordering product list 511, the date and hour of registration of auction ordering information, the subject product number of the auction ordering information, and a flag representing the auction completion state are shown to be displayed. However, other detailed information may be displayed. As for such an ordering situation, auction ordering information given from another purchasing person may be displayed.

In the case where the auction ordering information is to be displayed/corrected, a subject ordering product is selected out of the ordering product list 511 and the display/correction button 512 is pressed. Thereupon, auction ordering information is displayed in the auction condition input editor 31. In the case where the auction ordering information is to be corrected, new auction ordering information is generated on the basis of the above described method and registered in the electronic marketplace server 11. In the case where ordering is to be suspended, a subject ordering product is selected out of the ordering product list 511 and the suspension button 513 is pressed.

In the case where the auction result is to be displayed, a subject ordering product is selected out of the ordering product list 511 and the result display button 514 is pressed. Thereupon, an auction result screen 61 shown in FIG. 7 appears. The auction result screen 61 includes a successful bid result 611, a transaction process 612, a rule result 613 contained in the auction ordering information, and a button 614 for closing the screen.

In the successful bid result 611, a successful bid result concerning the purchasing person and the entire successful bid result are included. The entire successful bid result includes hammer prices and the quantities of the successful bids in the order of success bid.

In the transaction process 612, the price, amount and situation are included. The situation indicates the situation at that time. As the situation, "there are no desiring persons", "successful bidder determined", "competition occurrence and price rise", "competition continuation and price rise", or "competition vanished and successful bidder determined", for example, is displayed. The message "there are no desiring persons" indicates that there are no purchasing persons. The message "successful bidder determined" indicates that there are purchasing persons and a successful bidder has been determined. The message "competition occurrence and price rise" indicates the occurrence of a competition and a price rise caused to eliminate the competition. The message "competition continuation and price rise" indicates that the competition is not eliminated and the price has risen for competition elimination. And the message "competition vanished and successful bidder determined" indicates the competition elimination, the determination of a successful bidder, and a price rise for competition elimination. In the case where a successful bid has been conducted, the successful bid amount is included.

In the rule results 613, the behavior of rules contained in the auction ordering information at the time of the auction are included. In the case where a successful bid has been conducted, the behavior at the time of the auction includes the hammer price and the successful bid amount. In the case where a successful bid has not been conducted due to a competition, the behavior at the time of the auction includes failed prices. In the case where a rule has not been used, the fact is included in the behavior.

Figure 8:
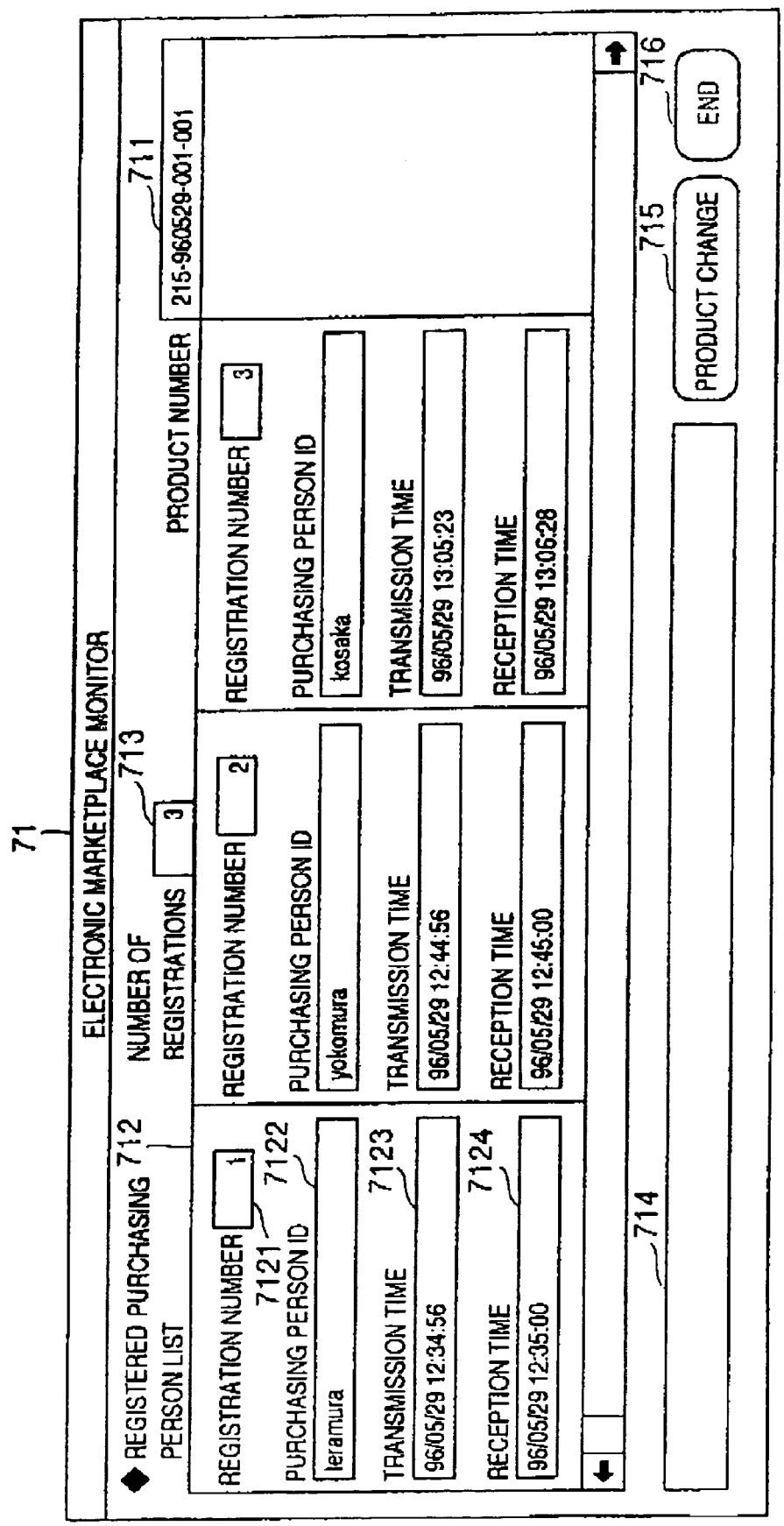
FIG. 8 is an electronic marketplace monitor in an embodiment of the present invention.

Monitoring of the auction ordering information in the electronic marketplace server 11 will now be described. In FIG. 8, an electronic marketplace monitor 71 is shown. In the electronic marketplace monitor 71, a monitored product number 711, a registered purchasing person list 712, number of registrations 713, a message column 714, a product change button 715, and an end button 716 are included.

Figure 9:
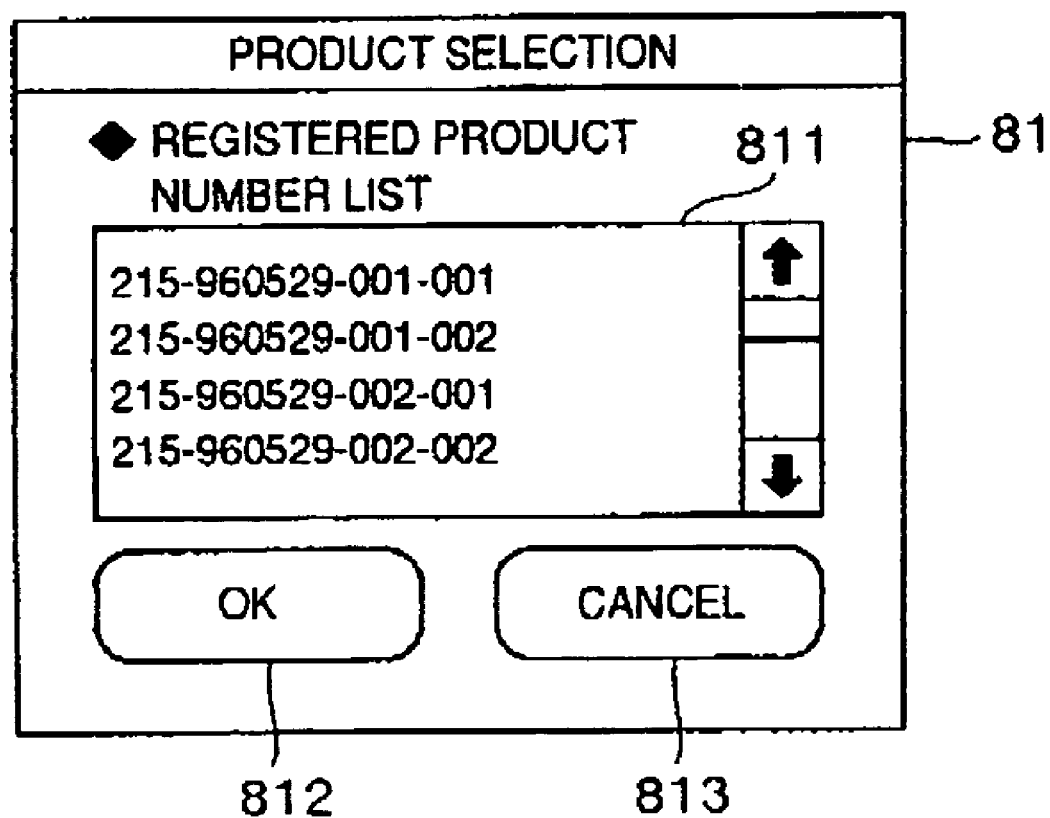
FIG. 9 is a selection screen of products monitored by the electronic marketplace monitor in an embodiment of the present invention.

In the case where the monitored product is to be changed, the product change button 715 is pressed and the change is conducted by using a product selection screen 81 shown in FIG. 9. On the product selection screen 81, a registered product number list 811, an OK button 812, and a cancel button 813 are displayed. As for the change of the monitored product, a product to be monitored is selected out of the product number list 811 and the OK button 812 is pressed. In the case where the change is to be suspended, the cancel button 813 is pressed.

For each of purchasing persons who registered the auction ordering information, the registered purchasing person list 712 includes a registration number 7121, a purchasing person ID 7122, transmission time 7123 of auction ordering information from the purchasing person client 12, and reception time 7124 of the auction ordering information in the electronic marketplace server 11. In the number of registrations 713, the current number of registrations of the auction ordering information is displayed. In the case where something should happen during monitoring, a predetermined message depending thereupon is displayed in a message 714.

Figure 10:
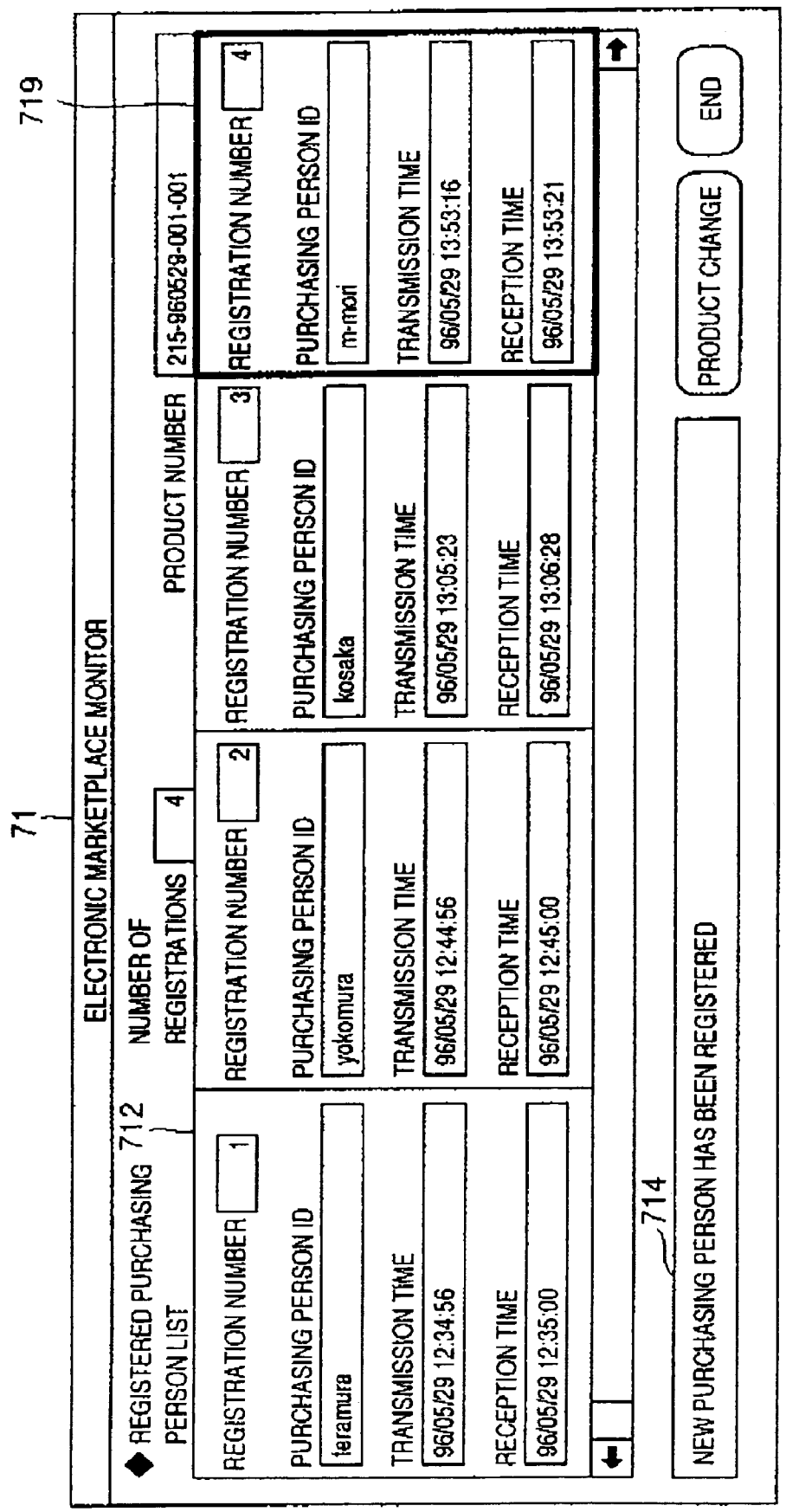
FIG. 10 shows the electronic marketplace monitor in the case where there is a new registrator in an embodiment of the present invention.

In the case where auction ordering information of a product to be monitored has been received during monitoring of the auction ordering information, information 719 concerning the purchasing person who transmitted the newly received auction ordering information is displayed in the registered purchasing person list 712 as shown in FIG. 10. At the same time, a message indicating that the auction ordering information has newly arrived is displayed in the message column 714. At this time, an operation for calling the attention of an operator, such as a flashing display of information concerning the newly registered purchasing person, or a sound indication, may be conducted simultaneously.

Figure 11:
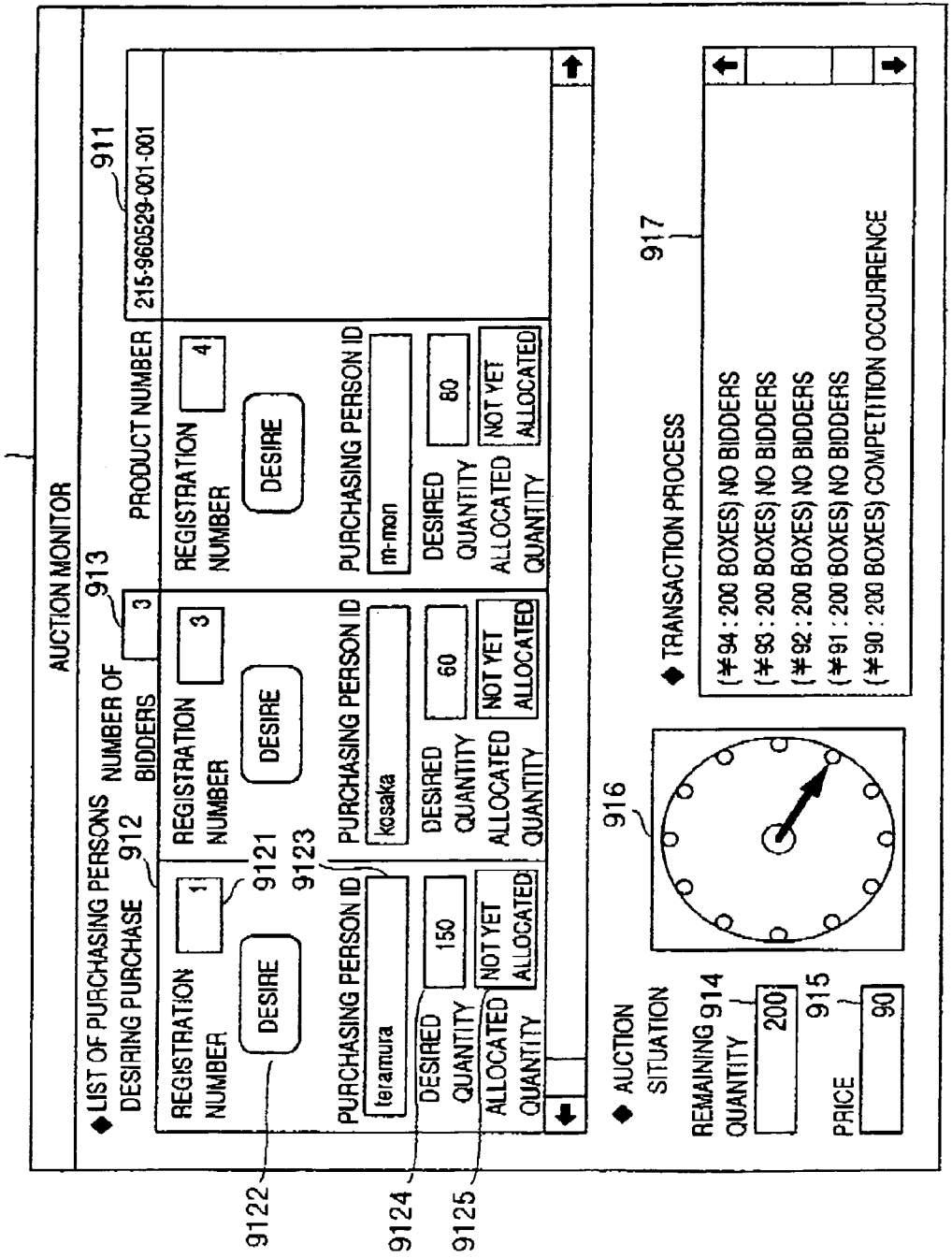
FIG. 11 shows an auction monitor in competition in an embodiment of the present invention.

Execution of an auction and monitoring of the execution will now be described. FIG. 11 shows an auction monitor 91, which is displayed on the output device 113 of the electronic market server 11 while an auction is being conducted. The auction monitor 91 includes a product number under auction 911, a list of purchasing persons who desire purchase 912, a number of purchasing persons who desire purchase 913, a remaining number of products 914, a current price 915, a field for visually displaying the current price 916, and a transaction process 917. As the field 916, a circular shaped gauge is used in FIG. 11.

For each purchasing person on the list of purchasing persons who desire purchase 912 includes a registration number 9121, a purchasing person state 9122, a purchasing person ID 9123, a desired amount 9124, and an allocated amount 9125. In the purchasing person state 9122, a state such as "desire" representing a desire for purchase, "abandon" representing abandonment of the purchase, or "successful bid" representing that a successful bid has been determined is displayed.

The price 915 and the field 916 are moved in response to a price change so as to be interlocked with each other. The gauge of the field 916 is rotated in the counterclockwise direction whenever the price rises and rotated in the clockwise direction whenever the price falls. A price may be plotted on each indication point of the field 916 for more legibility. By doing so, the person watching the auction monitor 91 can judge visually with more ease whether the price has risen or fallen.

The transaction process 917 includes the contents contained in the transaction process 612 shown on the auction result screen 61 in the purchasing person client 12. Here, the purchasing person ID who has conducted a successful bid is also included. Furthermore, a message for an operator monitoring the auction may also be included.

Figure 12:
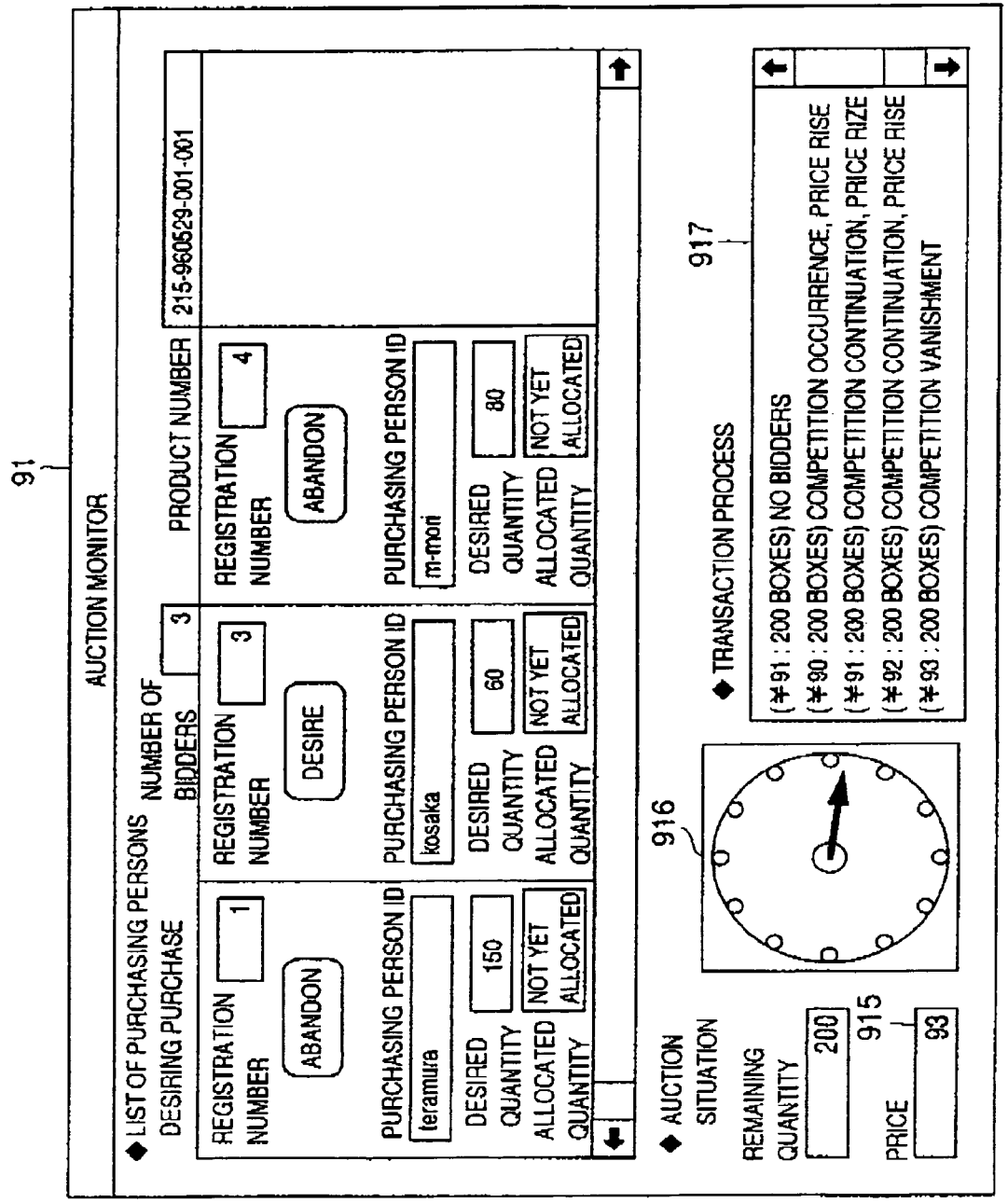
FIG. 12 shows the auction monitor at the time competition vanishes in an embodiment of the present invention.

Examples of the auction monitor 91 in the middle of the auction are shown in FIGS. 11, 12 and 13.

In FIG. 11, registration numbers 1, 3 and 4, i.e., purchasing persons teramura, kosaka, and m-mori, desire the purchase when the price has reached ¥90. The desired amounts are 150, 60 and 80, respectively. In the transaction process 917, the fact that a competition has occurred at ¥90 is displayed.

From the state of FIG. 11, the price rises and the price has reached ¥93 as shown in FIG. 12. The current price 915 becomes 93, and the field 916 also rises according to it. At the time point of ¥93, the purchasing persons teramura and m-mori having the register numbers 1 and 4 give up the purchase. As a result, the competition vanishes. In the transaction process 917, the fact that the competition has vanished at ¥93 is displayed. When the price is rising, the background color of the field 916 may be changed or a sound may be produced in order to emphasize the fact that the price is rising.

The competition has vanished as shown in FIG. 12, and a successful bidder has been determined as shown in FIG. 13. The purchasing person kosaka of the registration number 3 is a successful bidder. In the transaction process 917, the fact that kosaka has conducted a successful bid for 60 boxes at ¥93 is displayed. The remaining quantity 914 has changed from 200 to 140.

The display of the auction ordering situation (FIG. 6), monitoring of the ordering situation (FIGS. 8, 9 and 10), and the display of the auction monitor (FIGS. 11, 12 and 13) are executed at any time according to a request from the terminal of the electronic marketplace server 11.

The auction method of the present invention will now be described in further detail. FIG. 1 is a processing flow of the entire automatic auction executed by the electronic marketplace server 11. Here, an auction is conducted on the basis of "method of descending price." In the "method of descending price," the auction is conducted while the price is being lowered.

First of all, an initial price is set (step 1101). This may be set equal to a calculable value such as a fixed value times the average successful bid price of the previous day, a fixed value times the average successful bid price of the past, or a fixed value times the average successful bid price of the same variety of another marketplace. In any case, a method should be chosen that eliminates any suspicion of price manipulation conducted by an auctioneer so that fairness can be maintained.

In the case where this price has become lower than the lowest price predetermined by the shipping person client 13, the auction is finished. In the case where the price is not lower than the lowest price, the processing proceeds to step 1104 (step 1103). At step 1104, a purchasing person desiring the purchase is searched by using a purchase desiring purchasing person search routine. If there is a purchase desiring purchasing person, processing proceeds to step 1106. If there is not a purchase desiring purchasing person, then the price is lowered by a predetermined fixed value (step 1102), and thereafter processing proceeds to step 1103 (step 1105).

At step 1106, it is determined whether there is a competitive state by using a competitive state judging routine. In the case where there is not a competitive state, processing proceeds to step 1109 (step 1107). In the case of a competitive state, the competitive state vanishes by using a competition vanishing routine (step 1108). Subsequently, products are allocated among purchasing persons desiring the purchase by using a product allocation routine (step 1109). If there are remaining products, the processing proceeds to the step 1103. If there are no products, the auction is finished (step 1110).

The processing procedure of the purchase desiring purchasing person search routine (step 1104 of FIG. 1) will now be described by referring to FIG. 14. In the case of the competitive state, operations as far as step 1206 are repeated for all purchasing persons desiring the purchase. In the case of a noncompetitive state, operations as far as the step 1206 are repeated for all registered purchasing persons except purchasing persons who did not participate in the auction after conducting a successful bid once and who conducted a successful bid once (step 1201).

For all rules held by a subject purchasing person excepting rules fired once, operations as far as step 1204 are repeated (step 1202). Here, "firing" means participating in the auction, and means the case where the set price of the auction coincides with the desired auction price or the case where the set price of the auction is contained in the highest possible price for the desired auction price.

If the current price is greater than the sum of the specified price of the subject rule and the highest possible price in competition in the competitive state and if the current price is greater than the specified price of the subject rule in the noncompetitive state, the processing proceeds to step 1204. Otherwise, the processing proceeds to step 1207 (step 1203).

If the current price is greater than the specified price of the subject rule, then the step 1203 is repeated until all rules held by the purchasing person excepting fired rules are finished (step 1204). If the repetitive processing is finished, the subject purchasing person is excluded from purchase desiring purchasing persons (step 1205). Until the loop condition of the step 1201 is finished, the processing is repeated (step 1206).

If the current price is less than the specified price of the subject rule at the step 1203, a minimum desired amount and a maximum desired amount are set on the basis of the subject rule. In other words, if the amount specification of the subject rule is all amount purchase, the minimum desired amount is set equal to 0 and the maximum desired amount is set equal to the remaining quantity. If the amount specification of the subject rule is fixed amount purchase, the minimum desired amount is set equal to a specified amount and the maximum desired amount is set equal to a specified amount. If the amount specification of the subject rule is range designation purchase and its upper limit value is not prescribed, then the minimum desired amount is set equal to its lower limit value and the maximum desired amount is set equal to the remaining quantity. If the amount specification of the subject rule is range designation purchase and its lower limit value is not prescribed, then the minimum desired amount is set equal to 0 and the maximum desired amount is set equal to its upper limit value. If the amount specification of the subject rule is range designation purchase and both its upper limit value and its lower limit value are not prescribed, then the minimum desired amount is set equal to the lower limit value and the maximum desired amount is set equal to the upper limit value (step 1207).

It is determined whether the remaining quantity is less than the minimum desired amount set at the step 1207. If the remaining quantity is less than the minimum desired amount, then the processing proceeds to the step 1204. If the remaining quantity is greater than the minimum desired amount, then the processing proceeds to step 1209 (step 1208). The subject purchasing person is set to a purchase desiring purchasing person, and the firing rule is set to a subject rule (step 1209).

The detailed processing procedure of the competitive state judging routine (step 1106 of FIG. 1) will now be described by referring to FIG. 15. First of all, the sum total (sum total 1) of the minimum desired amounts of the purchasing persons desiring the purchase is calculated (step 1301). The minimum desired amount is a value set at the step 1207 of FIG. 14. If the remaining quantity is less than the sum of the sum total 1 derived at the step 1301 and the number of purchase desiring purchasing persons each having a minimum desired amount equal to zero, then the processing proceeds to step 1303. Otherwise, the state is judged to be an allocatable state and the judging routine is finished (step 1302).

Among the purchase desiring purchasing persons each having a nonzero desired amount, some persons do not purchase according to the amount condition of the firing rule if the amount is less than the minimum desired amount. The sum total (sum total 1) of the minimum desired amounts of such purchase desiring purchasing persons is calculated (step 1303).

If the remaining quantity is less than the sum of the sum total 2 derived at the step 1303, the number of purchase desiring purchasing persons each having a minimum desired amount equal to zero, and the number of purchase desiring purchasing persons who are included in the purchase desiring purchasing persons each having a nonzero minimum desired amount and who purchase even if the amount is less than the minimum desired amount according to the amount condition of the firing rule, then the state is judged to be a competitive state and the judging routine is finished. Otherwise, the processing proceeds to step 1305 (step 1304).

For the purchase desiring purchasing persons who are included in the purchase desiring purchasing persons each having a nonzero minimum desired amount and who purchase even if the amount is less than the minimum desired amount according to the amount condition of the firing rule, the minimum desired amount is set equal to 0. The state is judged to be an allocatable state, and the judging routine is finished (step 1305).

Figure 16:
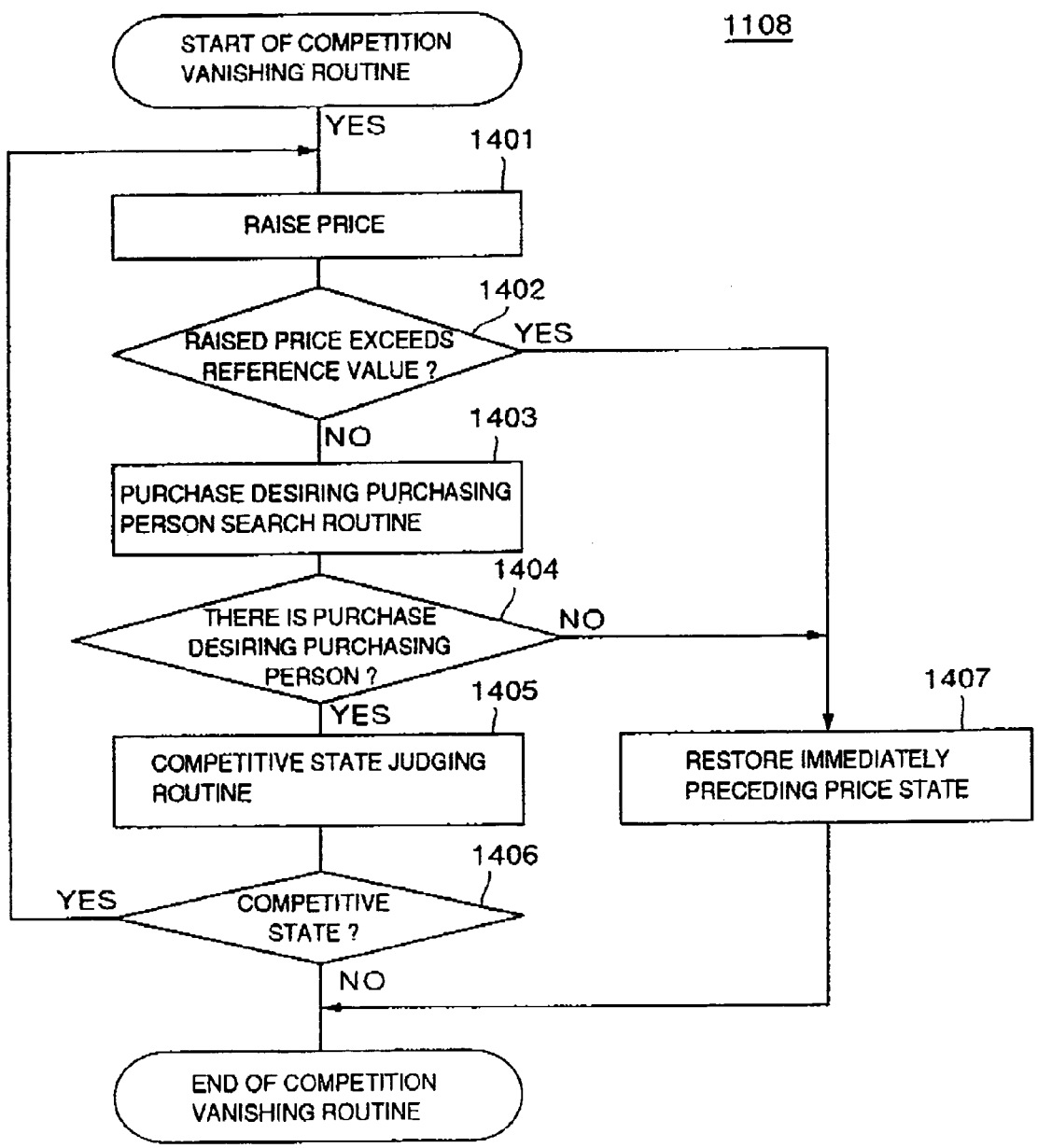
FIG. 16 is a processing flow diagram of a competition vanishing routine showing an embodiment of the present invention.

The detailed processing procedure of the competition vanishing routine (step 1108 of FIG. 1) will now be described by referring to FIG. 16. In the conventional auction method, the auction is conducted by gradually lowering the price. Once a competitive state is brought about, however, the auction is conducted by gradually raising the price and consequently narrowing down the purchasing persons in the present invention.

If a competition has occurred, the price is raised by a predetermined value (step 1401). If a resultant price has exceeded a predetermined fixed reference value, the processing proceeds to step 1407. If the resultant price has not exceeded the reference value, the processing proceeds to step 1403 (step 1402).

Figure 14:
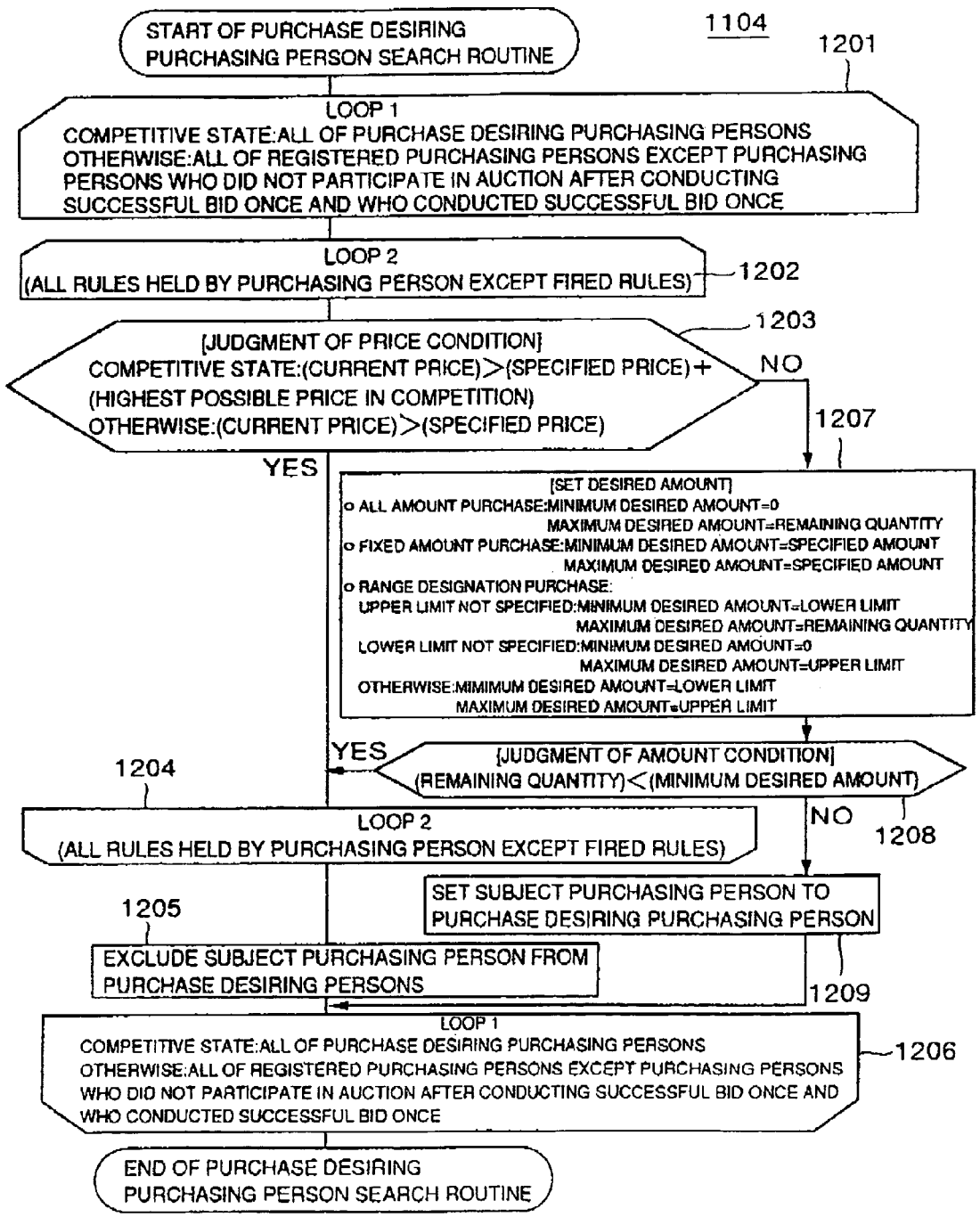
FIG. 14 is a processing flow diagram of a purchase desiring purchasing person search routine showing an embodiment of the present invention.
Figure 15:
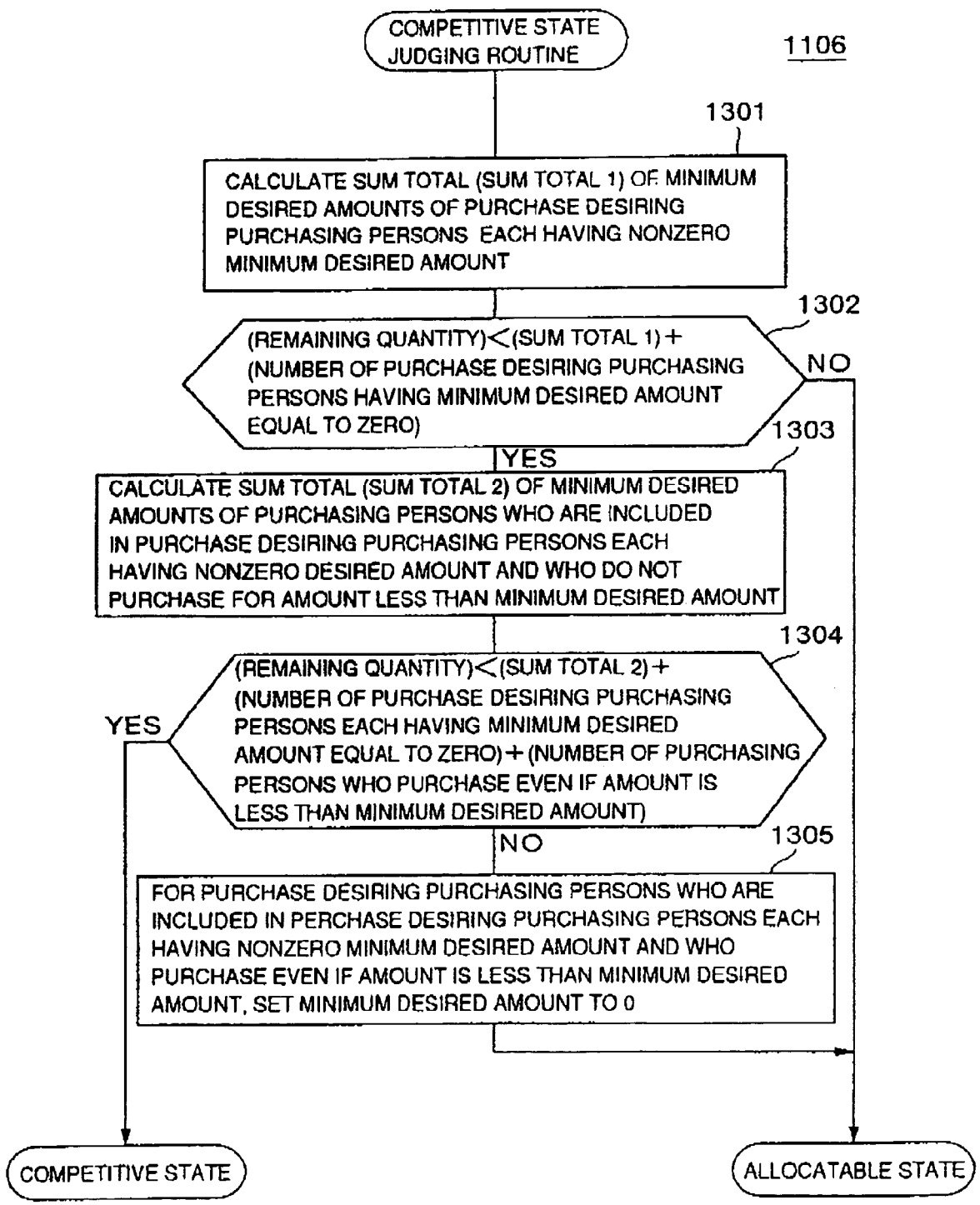
FIG. 15 is a processing flow diagram of a competition judging routine showing an embodiment of the present invention.

By using the purchase desiring purchasing person search routine 1104 shown in FIG. 14, a purchase desiring purchasing person is searched for (step 1403). If there is a purchase desiring purchasing person, the processing proceeds to step 1405. If there is not a purchase desiring purchasing person, the processing proceeds to step 1407 (step 1404). Subsequently, by using the competitive state judging routine 1106 of FIG. 15, it is determined whether the current state is a competitive state (step 1405).

In the case of the competitive state, the processing proceeds to step 1401. If the current state is not a competitive state, the processing is finished (step 1406). In the case where the processing has proceeded to the step 1407, the immediately preceding price state is restored. In this state, returning the state concerning the purchase desiring purchasing person to the original state is also included.

Figure 17:
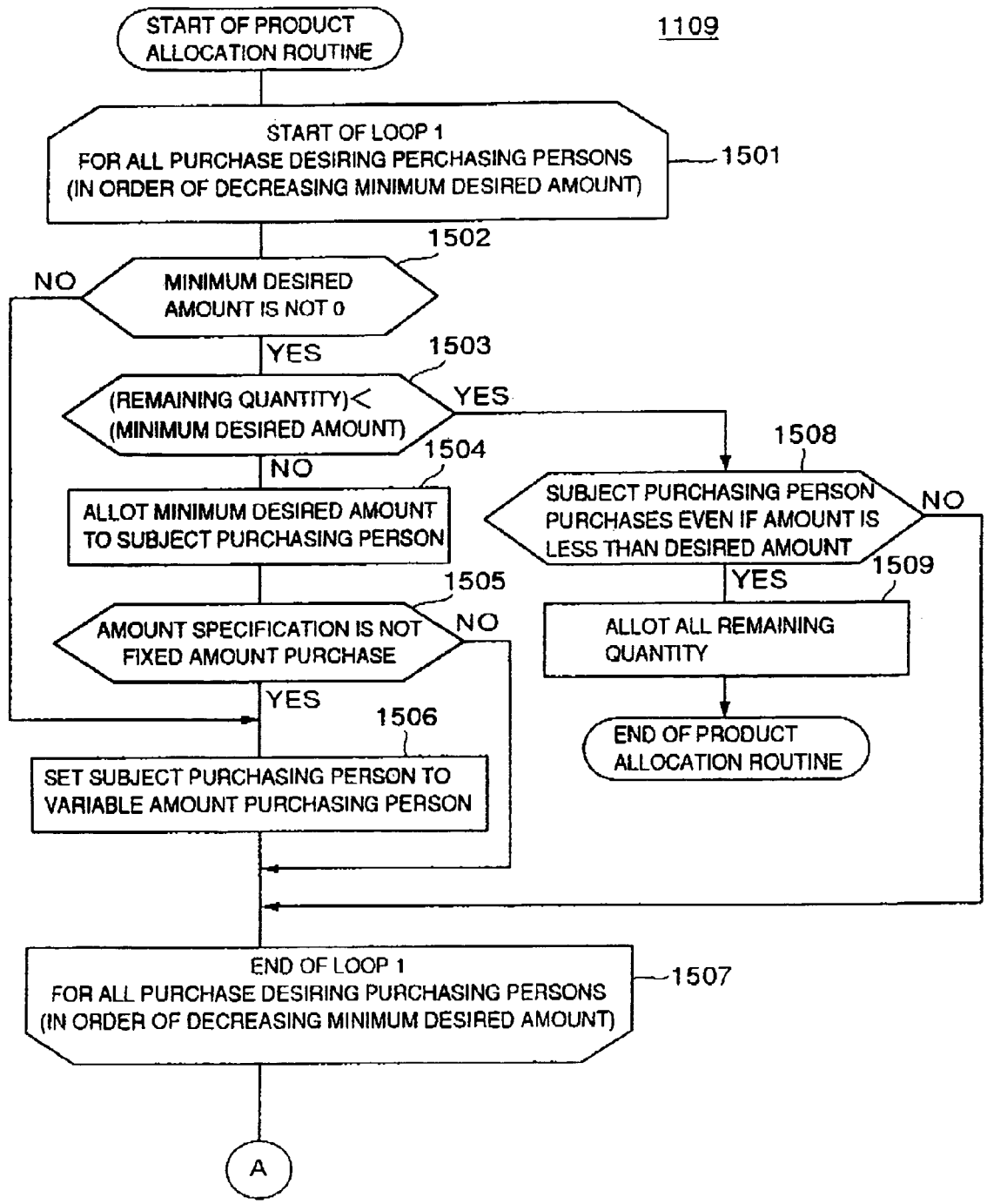
FIG. 17 is a processing flow diagram of a product allocation routine showing an embodiment of the present invention.

The processing flow of the product allocation routine (step 1109 of FIG. 1) will now be described by referring to FIGS. 17 and 18. In the ensuing processing, the minimum desired amount and the maximum desired amount are set at the step 1207 of the purchase desiring purchasing person search routine shown in FIG. 14.

For all of the purchase desiring purchasing persons, the processing as far as step 1507 is repeated in the order of decreasing minimum desired amount, and in the order of time of registration of the auction ordering information to the electronic marketplace server 11 in the case where the minimum desired amounts are the same (step 1501). If the minimum desired amount of the subject purchasing person is not 0, then the processing proceeds to step 1503. If the minimum desired amount of the subject purchasing person is 0, then the processing proceeds to step 1506 (step 1502). If the remaining quantity is at least the minimum desired amount of the subject purchasing person, then the processing proceeds to step 1504. If the remaining quantity is less than the minimum desired amount of the subject purchasing person, then the processing proceeds to step 1508 (step 1503).

The minimum desired amount is allotted to the subject purchasing person, and the remaining quantity is decreased by the minimum desired amount (step 1504). If the amount specification of the firing rule of the subject purchasing person is not the fixed amount purchase, then the processing proceeds to the step 1506. In the case of the fixed amount purchase, the processing proceeds to the step 1507 (step 1505). The subject purchasing person is set to a variable amount purchasing person (step 1506).

Until the above described condition of the loop 1 is finished, the processing beginning from the step 1501 is repeated (step 1507). At step 1508, the processing proceeds to step 1509, in the case where the subject purchasing person purchases according to the firing rule of the subject purchasing person even if the amount is less than the desired amount. In the case where the subject purchasing person does not purchase, the processing proceeds to step 1507. All of the remaining quantity is allotted to the subject purchasing person (step 1509), and the processing is finished.

If at the step 1507 there is a remaining product and there is a variable amount purchasing person, then the processing proceeds to step 1511. If there is not a remaining product or there is not a variable amount purchasing person, then the processing is finished (step 1510).

As a loop 2, processing as far as step 1516 is repeated for all of the variable amount purchasing persons (step 1511). The amount allotted to the subject purchasing person is increased by one (step 1512). If the amount allotted to the subject purchasing person is equal to the maximum desired amount, the processing proceeds to step 1514. If the amount allotted to the subject purchasing person is not equal to the maximum desired amount, the processing proceeds to step 1515 (step 1513).

At step 1514, the subject purchasing person is not set to a variable amount purchasing person. If there is a remaining product, the processing proceeds to step 1516. Otherwise, the processing is finished (step 1515). At step 1516, the processing is repeated until the processing is finished for all of the variable amount purchasing persons.

Heretofore, detailed embodiments have been described. The concrete automatic auction method will now be described by referring to FIGS. 19 and 20.

FIG. 19 shows a condition 2010 in the automatic auction. FIG. 20 shows "registered purchasing persons and their auction ordering information" 2020. In the auction condition 2010, the quantity, initial price, increment of descending price, lowest price, increment of ascending price in competition, and highest ascending price are included. For each of the registered purchasing persons, the "registered purchasing persons and their auction ordering information" 2020 includes an auction rule and a flag indicating whether the registered purchasing person participates in the auction after the person has conducted a successful bid once.

On the basis of the conditions included in the auction condition 2010, the electronic marketplace server 11 conducts an auction by using the "registered purchasing persons and their auction ordering information" 2020. Hereafter, contents of the operation will be described by referring to processing for each price.

(1) ¥100 to ¥96

From ¥100, the price is lowered by the predetermined increment of descending price (¥1). Even when the price has been lowered to ¥96, there are no purchasing persons desiring the purchase. Therefore, the price is further lowered.

(2) ¥95

A rule 2021 of a purchasing person A is fired. In other words, the purchasing person A appears as the purchase desiring purchasing person who coincides with the price condition (¥95). While the remaining quantity is 200 boxes, the desired quantity of the purchasing person A is 60 boxes. At this time, therefore, a competition does not occur. Accordingly, the desired amount of 60 boxes is allotted to the purchasing person A, and the remaining quantity is set to 140 boxes. As for the auction reopening price, the successful bid price ¥95, a price ¥94 next to the successful bid price, or a price raised by a constant ratio may be used. It is now assumed that the auction is reopened with the successful bid price.

(3) ¥95 to ¥91

The price is lowered by the predetermined increment of descending price (¥1). Even when the price has been lowered to ¥91, there are no purchasing persons desiring the purchase. Therefore, the price is further lowered. The rule 2021 of the purchasing person A does not become the subject of the evaluation, because its transaction has already been settled.

(4) ¥90

A rule 2022 of a purchasing person B and a rule 2023 of a purchasing person C are fired. As the purchase desiring purchasing person, the purchasing person B and the purchasing person C appear. While the remaining quantity is 140 boxes, the desired quantities are 100 boxes and 80 boxes, respectively. Since the total desired quantity is thus 180 boxes, a competition occurs. By raising the price by the predetermined increment of ascending price in competition (¥1), therefore, the competition is eliminated.

(5) ¥91 and ¥92

The highest possible price in competition is ¥2 in the rule 2022 of the purchasing person B. The highest possible price in competition is ¥4 in the rule 2023 of the purchasing person C. Even if the price is raised to ¥91, and then ¥92, therefore, both the purchasing person B and the purchasing person C desire the purchase. As a result, the competition does not vanish, and the price is further raised.

(6) ¥93

The raised price exceeds the highest possible price in competition (+¥2) in the rule 2022 of the purchasing person B. Therefore, the purchasing person B gives up the purchase, and the competition is vanished. As for the purchasing person C, the raised price is within the highest price in competition (+¥4) in the rule 2023 of the purchasing person C. At the price within the range of purchase desire, therefore, the transaction is settled. As a result, the desired quantity of 80 boxes is allotted to the purchasing person C, and the remaining quantity becomes 60 boxes.

(7) ¥93 to ¥89

Due to the competitive state, the price was raised once. Since the competition has been vanished, an auction is conducted again with the remaining quantity. At the reopening price ¥93, there are no purchasing persons desiring the purchase. Therefore, the price is lowered by the predetermined increment of descending price (¥1). When the price is lowered to ¥90, it coincides with the price specified by the purchasing person B. Since the remaining quantity is 60 boxes, however, it does not coincide with the purchase condition of the purchasing person B. Therefore, the transaction with the purchasing person B is not settled. Accordingly, the price is further lowered.

(8) ¥88

Since there are no purchasing persons desiring the purchase at ¥89, the price is further lowered. Thereupon, a rule 2024 of a purchasing person D is fired, and the purchasing person D appears as the purchasing person desiring the purchase. While the remaining quantity is 60 boxes at this time, the minimum desired amount is 50 boxes. Therefore, a competition is not caused. The minimum desired amount of 50 boxes is first allotted to the purchasing person D, and the purchasing person D is set as the variable amount purchasing person. Since the remaining quantity is 10 boxes, the remaining quantity of 10 boxes is allotted to the purchasing person D which is the variable amount purchasing person. As a result, the purchasing person D purchases 60 boxes. Accordingly, the remaining quantity becomes 0 boxes, and the auction is finished.

In the present embodiment, the purchasing person client 12 registers rules concerning the auction into the electronic marketplace server 11 as the auction ordering information. The electronic marketplace server 11 conducts the auction on the basis of the auction ordering information. Therefore, it becomes unnecessary for the purchasing person client 12, i.e., the bidder, to stay before the auction terminal at the time of the auction.

By making the rule include the purchase conditions, it becomes possible to automatically and flexibly cope with the situation change at the time of the auction. Thus the on-line and real time properties are not necessarily required. As a result, auction transactions become possible on an open network on which it is difficult to assure the on-line and real time properties.

A countermeasure to the security will now be described. For implementing a safe auction, it becomes necessary to prevent a malicious third party from participating in the transaction and keep data concerning the auction secret (i.e., prevent wiretapping and falsifying). For this purpose, the following methods are used.

First of all, individual authentication is conducted by sending the purchasing person ID and the password from the purchasing person client 12 to the electronic marketplace server 11 at least one timing instant such as at the time of connection to the electronic marketplace server 11, before the procurement of the product information, before the transmission of the auction ordering information, before the procurement of the auction ordering situation, before the modification of the auction ordering information, before suspension of the auction ordering, and before the procurement of the auction result.

When a purchasing person client 12 is registered as a purchasing person of the electronic marketplace server 11, the purchasing person ID and the password of the purchasing person are sent via telephone, FAX, mail or the communication network 14.

Subsequently, encryption processing is effected for various kinds of information exchanged between the electronic marketplace server 11 and the purchasing person client 12. As for the encryption method used in the encryption processing, either of the public key encryption system (such as RSA) or the common key encryption system (such as the DES (Data Encryption Standard)) may be used. As for the allocation of the encryption key, it is sent to a purchasing person client 12 via a storage medium such as an IC card or a floppy disk, or via the communication network 14, when the purchasing person client 12 has been registered as a purchasing person of the electronic marketplace server 11.

Owing to the countermeasures heretofore described, it becomes possible to prevent a third party who does not know the purchasing person ID and the password from participating in the transaction. Furthermore, it becomes possible to prevent a person having no encryption key from conducting wiretapping for data concerning the auction and falsifying the data concerning the auction.

As heretofore described in detail, the present invention solves the above described problems of the conventional technique and makes it unnecessary for bidders to stay before auction terminals at the time of auction. In addition, auction transactions become possible on an open network on which it is difficult to assure the on-line and real time properties. Thus the present invention brings about significant effects.

What is claimed is:

1. An auction method of determining a successful bidder for a single kind of product or products, the auction method being executed in a server computer connected with a plurality of client computers via a network, each client computer belonging to a respective bidder, the auction method comprising the steps of:

a) transmitting, from the server computer, information on a product to be auctioned to the plurality of client computers via the network;

a') establishing, in the server computer, a current auction price against which bids are judged;

b) receiving, in the server computer, a rules set including at least one rule defining participation in the auction by a bidder, from each of the plurality of client computers via the network;

b') determining, in the server computer, and based on the rules set received for each bidder, a desired auction price that a bidder, is willing to bid for the product, optionally with a maximum allowed price greater than said desired auction price that a bidder is willing to bid;

c) judging, in the server computer, whether the current auction price is equal to or lower than the desired auction price determined according to the rules set received in step b) from each of the plurality of client computers that the bidder, is willing to bid, for each bidder;

d) determining, in the server computer, each remaining bidder who has sent the rules set by which it is judged that the current auction price is equal to or lower than the desired auction price judged in step c);

e) judging, in the server computer, whether a competitive state occurs or not, based on the amount of products to be auctioned and the sum of amounts of products that the bidders desire to purchase, wherein a state in which there is more than one remaining bidder as a result of said determining in step d) is defined as a competitive state;

f) in response to a judgment in step e) that the competitive state occurs, increasing, in the server computer, the current auction price and repeating steps c), d), and e) using the increased current auction price as the current auction price, wherein the repeating of steps c), d), and e) is performed until it is determined in step e) that no competitive state occurs;

wherein if the current auction price is greater than the desired auction price upon repeating step c), the repeated step c) judges whether the current auction price is equal to or lower than the maximum allowed price if present in the rules set as determined according to the rules set received in step b) from each of the plurality of client computers that the bidder is willing to bid, for each bidder, and the repeated step d) determines each remaining bidder if the current auction price exceeds the maximum allowed price judged in step c); and g) in response to a judgment in step e), the competitive state does not occur, determining, in the server computer, the remaining bidder as a successful bidder.

2. An auction method in accordance with claim 1, further comprising the steps of:
h) determining, in the server computer, an abandoned bidder who sent the, rules set by which it is judged that the current auction price is higher than the desired auction price or maximum allowed price judged in step c); and
i) excluding the abandoned bidder.

3. An auction method in accordance with claim 1, wherein a plurality of products are auctioned and a plurality of successful bidders are determined in the auction method.

4. An auction method in accordance with claim 1, wherein in the step f), the current auction price is increased by a predetermined value; and
wherein the server computer holds the predetermined value.

5. An auction method in accordance with claim 1, further comprising the steps, in the server computer, of:
reducing the current auction price if no bidder exists;
checking whether at least one bidder exists,
determining the existing bidder as a successful bidder if one bidder exists, and
further reducing the current auction price if no bidder exists and repeating the checking determining, and further reducing steps.

6. An auction method in accordance with claim 1, further comprising the steps, in the server computer, of:
reducing the current auction price if no bidder exists;
checking whether at least one bidder exists,
determining the existing bidder as a successful bidder if one bidder exists, and
further reducing the current auction price if no bidder exists and repeating the checking determining, and further reducing steps,
wherein the server computer determines that the bidder exists when the current auction price, is reduced to the desired auction price of the bidder.

7. An auction method in accordance with claim 1, wherein, in the step e), it is determined that a competitive state occurs when the sum of amounts of products that the bidders desire to purchaser is larger than the amount of products to be auctioned.

8. An auction method in accordance with claim 7, wherein, in the step e), if the total of (1) the sum of minimum desired amounts of bidders who are included in the bidders each having a nonzero desired amount and who do not purchase for an amount less than a minimum desired amount, (2) the number of bidders each having a minimum desired amount equal to zero, and (3) the number of bidders who purchase even if the amount is less than the minimum desired amount, is equal to or less than the remaining quantity of the products, the server computer determines that the competitive state does not occur.

9. An auction method in accordance with claim 1, p1 wherein the step f) further includes the step of determining a successful price of the successful bidder, and wherein the successful price is equal to or less than the desired auction price or maximum allowed price that the successful bidder is will to bid for the product and higher than the current auction price judged in step c) before the competitive state is resolved by the increased current auction price.

10. An auction method in accordance with claim 1, further comprising the step of:
j) displaying, during the auction, a transaction process when the competitive state is resolved and a transaction process during the competitive state before the competitive state is resolved.

11. An auction device of determining a successful bidder for a single kind of product or products, the auction device being connected with a plurality of client computers via a network, each client computer belonging to a respective bidder, the auction device comprising:
first means for transmitting information on a product to be auctioned to the plurality of client computers via the network;
establishing means for establishing a current auction price against which bids are judged;
second means for receiving a rules set including at least one rule defining participation in the auction by a bidder, from each of the plurality of client computers via the network;
determining means for determining, based on the rules set received for each bidder, a desired auction price that a bidder, is willing to bid for the product, optionally with a maximum allowed price greater than said desired auction price that a bidder is willing to bid;
third means for judging, whether the current auction price is equal to or lower than the desired auction price determined according to the rules set received by the second means from each of the plurality of client computers that the bidder, is willing to bid, for each bidder;
fourth means for determining each remaining bidder who has sent the rules set by which it is judged that the current auction price is equal to or lower than the desired auction price judged in the third means;
fifth means for judging whether a competitive state occurs or not, based on the amount of products to be auctioned and the sum of amounts of products that the bidders desire to purchase, wherein a state in which there is more than one remaining bidder as a result of said determining in step d) is defined as a competitive state;
wherein in response to a judgment by the fifth means that the competitive state occurs, the third, fourth, and fifth means are repeatedly executed using an increased current auction price as the current auction price, wherein the repeated execution of the third, fourth, and fifth means is performed until it is judged by the fifth means that no competitive state occurs;
wherein if the current auction price is greater than the desired auction price upon repeating execution of the third means, the repeated execution of the third means judges whether the current auction price is equal to or lower than the maximum allowed price if present in the rules set as determined according to the rules set received by the second means from each of the plurality of client computers that the bidder is willing to bid, for each bidder, and the repeated execution of the fourth means determines each remaining bidder if the current auction price exceeds the maximum allowed price judged by the third means; and
sixth means for, in response to judgment by the fifth means that the competitive state does not occur, determining the remaining bidder as a successful bidder 12. An auction device in accordance with claim 11, further comprising:
seventh means for determining an abandoned bidder who sent the rules set by which it is judged by the third means that the current auction price is higher than the desired auction price or maximum allowed price judged by the third means; and eighth means for excluding the abandoned bidder.

13. An auction device in accordance with claim 11,
wherein a plurality of products are auctioned and a plurality of successful bidders are determined.

14. An auction device in accordance with claim 11,
wherein the current auction price is increased by a predetermined value to become the increased current auction price; and
wherein the auction device further comprises means for holding the predetermined value.

15. An auction device in accordance with claim 11, further comprising seventh means for
reducing the current auction price if no bidder exists;
checking whether at least one bidder exists,
determining the existing bidder as a successful bidder if one bidder exists, and
further reducing the current auction price if no bidder exists and repeating the checking, determining, and further reducing processes.

16. An auction device in accordance with claim 11, further comprising seventh means for
reducing the current auction price if no bidder exists;
checking whether at least one bidder exists,
determining the existing bidder as a successful bidder if one bidder exists, and
further reducing the current auction price if no bidder exists and repeating the checking determining, and further reducing processes,
wherein the seventh means determines that the bidder exists when the current auction price is reduced to the desired auction price of the bidder.

17. An auction device in accordance with claim 11,
wherein the fifth means determines that the competitive state occurs when the sum of amounts of products that the bidders desire to purchase is larger than the amount of products to be auctioned.

18. An auction device in accordance with claim 17,
wherein the fifth means determines that the competitive state does not occur if the total sum of (1) the sum of minimum desired amounts of bidders who are included in the bidders each having a nonzero desired amount and who do not purchase for an amount less than the desired amount, (2) the number of bidders each having a minimum desired amount equal to zero, and (3) the number of bidders who purchase even if the amount is less than the desired amount, is equal to or less than the remaining quantity of the products.

19. An auction device in accordance with claim 11,
wherein the sixth means determines a successful price of the successful bidder, and wherein the successful price is equal to or less than the desired auction price or maximum allowed price that the successful bidder, is willing to bid for the product and higher than the current auction price judged by the third means just before the competitive state is resolved by the increased current auction price.

20. An auction device in accordance with claim 11, further comprising:
ninth means for displaying, during the auction, a transaction process when the competitive state is resolved and a transaction process during the competitive state before the competitive state is resolved.

21. An auction method of determining a successful bidder for a single kind of product or products, the auction method being executed in a server computer connected with a plurality of client computers via a network, each client computer belonging to a respective bidder, the auction method comprising the steps of:
a) transmitting, from the server computer, information on a product to be auctioned to the plurality of client computers via the network;
a') establishing, in the server computer, a current auction price against which bids are judged; b) receiving, in the server computer a rules set for ordering the product including at least one rule defined participation in the auction by a bidder, from each of the plurality of client computers via the network;
c) judging, in the server computer, for each bidder, and based on the rules set received in step b) whether the current auction price is equal to or lower than a desired auction price that the bidder is willing to bid for the product;
d) determining, in the server computer, each remaining bidder who has sent the rules set based on which it is judged that the current auction price is equal to or lower than the desired auction price judged in step c);
e) judging, in the server computer, whether there is more than one remaining bidder as a result of said determining in step d), wherein a state in which there is more than one remaining bidder as a result of said determining in step d) is defined as a competitive state;
f) in response to a judgment in step e) that there is a competitive state, increasing, in the server computer, the current auction price and repeating steps c), d), and e) using the increased current auction price as the current auction price, wherein the repeating of steps c), d), and e) is performed until it is judged in step e) that there is no competitive state;
wherein if the current auction price is greater than the desired auction price upon repeating step c), the repeated step c) judges whether the current auction price is equal to or lower than a maximum allowed price if present in the rules set as determined according to the rules set received in step b) from each of the plurality of client computers that the bidder is willing to bid, for each bidder, and the repeated step d) determines each remaining bidder if the current auction price exceeds the maximum allowed price judged in step c); and g) in response to a judgment in step e) that there is no competitive state, determining, in the server computer, the remaining bidder as a successful bidder.

22. An auction method in accordance with claim 21, wherein the maximum allowed price, is a sum total of the desired auction price with which the bidder, is willing to pay to purchase the product and an acceptable price which the bidder accepts to pay in addition to the desired auction price wherein the rules set includes the desired auction price and the acceptable price.

23. An auction method in accordance with claim 21, further comprising the steps of:
h) determining, in the server computer, an abandoned bidder who sent the rules set by which it is judged that the current auction price is higher than the desired auction price or maximum allowed price judged in step c); and
i) excluding the abandoned bidder.

24. An auction method in accordance with claim 21, wherein a plurality of products are auctioned and a plurality of successful bidders are determined in the auction method.

25. An auction method in accordance with claim 21,
wherein in step f), the current auction price is increased by a predetermined value; and wherein the server computer holds the predetermined value.

26. An auction method in accordance with claim 21, further comprising the steps, in the server computer, of:
reducing the current auction price if no bidder exists;
checking whether at least one bidder exists,
determining the existing bidder as a successful bidder if one bidder exists, and
further reducing the current auction price if no bidder exists and repeating the checking, determining, and further reducing steps.

27. An auction method in accordance with claim 22, further comprising the steps, in the server computer, of:
reducing the current auction price if no bidder exists;
checking whether at least one bidder exists,
determining the existing bidder as a successful bidder if one bidder exists, and
further reducing the current auction price if no bidder exists and repeating the checking determining, and further reducing steps,
wherein the server computer determines that the bidder exists when the current auction price is reduced to the desired auction price of the bidder.

28. An auction method in accordance with claim 21, wherein, in the step e), whether the competitive state occurs or not is determined based on the amount of products to be auctioned and the sum of amounts of products that the bidders desire to purchase.

29. An auction method in accordance with claim 28, wherein, in the step e), if the total of (1) the sum of minimum desired amounts of bidders who are included in bidders each having a nonzero desired amount, (2) the number of bidders each having a minimum desired amount equal to zero, and (3) the number of bidders who purchase even if the amount is less than the minimum desired amount, is equal to or less than the remaining quantity of the products, the server computer determines that the competitive state does not occur.

30. An auction method in accordance with claim 21, wherein the step f) further includes the step of determining a successful price of the successful bidder, and wherein the successful price is equal to or less than the desired auction price or maximum allowed price that the successful bidder, is willing to bid for the product and higher than the current auction judged in step c) just before the competitive state is resolved by increased current auction price.

31. An auction method in accordance with claim 21, further comprising the steps of:
j) displaying, during the auction, a transaction process when the competitive state is resolved and a transaction process during the competitive state before the competitive state is resolved.

32. An auction method in accordance with claim 21, wherein, when the plural bidders transmit the same rules set in step d), the products are allocated to the bidders in order of time of transmission of the rules set from the client computer to the server.

33. An auction device for determining a successful bidder for a single kind of product or products, the auction device being connected with a plurality of client computers via a network, each client computer belonging to a respective bidder, the auction device comprising:
first means for transmitting information on a product to be auctioned to the plurality of client computers via the network;
establishing means for establishing a current auction price against which bids are judged;
second means for receiving a rules set including at least one rule defining participation in the auction by a bidder, from each of the plurality of client computers via the network;
third means for judging, for each bidder and based on the rules set received by the second means, whether the current auction price is equal to or lower than a desired auction price that the bidder is willing to bid for the product;
fourth means for determining each remaining bidder who has sent the rules set by which it is judged that the current auction price is equal to or lower than the desired auction price judged by the third means;
fifth means for judging whether there is more than one remaining bidder as a result of said determining by said fourth means, wherein a state in which there is more than one remaining bidder as a result of said determining is defined as a competitive state,
wherein in response to a judgment by the fifth means that there is a competitive state, the third, fourth, and fifth means are repeatedly executed using an increased current auction price as the current auction price, wherein the repeated execution of the third, fourth, and fifth means is performed until it is judged by the fifth means that there is no competitive state;
wherein if the current auction price is greater than the desired auction price upon repeated execution by the third means, the repeated execution of the third means judges whether the current auction price is equal to or lower than the maximum allowed price if present in the rules set as determined according to the rules set received by the second means from each of the plurality of client computers that the bidder is willing to bid, for each bidder, and the repeated execution of the fourth means determines each remaining bidder if the current auction price exceeds the maximum allowed price judged by the third means; and
sixth means for, in response to judgment by the fifth means that there is no competitive state, determining the remaining bidder as a successful bidder.

34. An auction device in accordance with claim 33, wherein the maximum allowed price is a sum total of the desired auction price with which the bidder desires to purchase the product and an acceptable price which the bidder accepts to pay in addition to the desired auction price wherein the rules set includes the desired auction price and the acceptable price.

35. An auction device in accordance with claim 33, further comprising:
seventh means for determining an abandoned bidder who sent the rules set by which it is judged by the third means that the current auction price is higher than the desired auction price or maximum allowed price judged by the third means; and
eighth means for excluding the abandoned bidder.

36. An auction device in accordance with claim 33, wherein a plurality of products are auctioned and a plurality of successful bidders are determined.

37. An auction device in accordance with claim 33, wherein the current auction price is increased by a predetermined value to become the increasing current auction price; and
wherein the auction device further comprises means for holding the predetermined values.

38. An auction device in accordance with claim 33, further comprising seventh means for
   reducing the current auction price if no bidder exists;
   checking whether at least one bidder exists,
   determining the existing bidder as a successful bidder if one bidder exists, and
   further reducing the current auction price if no bidder exists and repeating the checking determining, and further reducing processes.

39. An auction device in accordance with claim 34, further comprising seventh means for
   reducing the current auction price if no bidder exists;
   checking whether at least one bidder exists,
   determining the existing bidder as a successful bidder if one bidder exists, and
   further reducing the current auction price if no bidder exists and repeating the checking determining, and further reducing processes,
   wherein the seventh means determines that the bidder exists when the current auction price is reduced to the desired auction price of the bidder.

40. An auction device in accordance with claim 33,
   wherein the fifth means determines whether the competitive state occurs or not based on the amount of products to be auctioned and the sum of amounts of products that the bidders desire to purchase.

41. An auction device in accordance with claim 40,
   wherein the fifth means determines the competitive state does not occur if the total sum of (1) the sum of minimum desired amounts of bidders who are included in bidders each having a nonzero desired amount and who do not purchase for an amount less than a minimum desired amount, (2) the number of bidders each having a minimum desired amount equal to zero, and (3) the number of bidders who purchase even if the amount is less than the minimum desired amount, is equal to or less than the remaining quantity of products.

42. An auction device in accordance with claim 33,
   wherein the sixth means determines a successful price of the successful bidder, and wherein the successful price is equal to or less than the desired auctin price or maximum allowed price that the successful bidder is willing to bid for the product and higher than the current auction price judged by the third means just before the competitive state is resolved by the increased current auction price.

43. An auction device in accordance with claim 33, further comprising:
   ninth means for displaying, during the auction, a transaction process when the competitive state is resolved and a transaction process during the competitive sate before the competitive state is resolved.

44. An auction device in accordance with claim 33, wherein, when the plural bidders transmit the same rules set, the fourth means allocates the products to the bidders in order of time of transmission of the rules set from the client computer to the server.

* * * * *